United States Patent
Suzuki et al.

[11] Patent Number: 5,268,907
[45] Date of Patent: Dec. 7, 1993

[54] COMMUNICATION APPARATUS WITH FAULT TOLERANCE

[75] Inventors: Satoshi Suzuki, Nagoya; Yoshihisa Sato, Nukata, both of Japan

[73] Assignee: Nippondenso Co., Ltd., Kariya, Japan

[21] Appl. No.: 840,897

[22] Filed: Feb. 26, 1992

[30] Foreign Application Priority Data

Feb. 26, 1991 [JP] Japan .................. 3-031041
Mar. 14, 1991 [JP] Japan .................. 3-049432
Dec. 24, 1991 [JP] Japan .................. 3-341269

[51] Int. Cl.$^5$ ............................................ G06F 11/20
[52] U.S. Cl. ..................................... 371/8.2; 371/20.1
[58] Field of Search .................... 371/8.2, 20.1, 29.5; 307/358, 355

[56] References Cited

FOREIGN PATENT DOCUMENTS 3826774 2/1990 Fed. Rep. of Germany .
1261047 10/1989 Japan .
1-317007 12/1989 Japan .

*Primary Examiner*—Vincent P. Canney
*Attorney, Agent, or Firm*—Cushman, Darby & Cushman

[57] ABSTRACT

A fault tolerant communication apparatus provided with balanced type transmission lines composed of first and second complementary transmission lines respectively transmitting first and second communication signals of different polarity, a transmission device for transmitting the first and second complementary communication signals through the balanced type transmission lines, a reception device for receiving the first and second complementary communication signals through the balanced type transmission lines and for receiving contents of a communication based on the complementary relation between the first and second communication signals, and a failure detection circuit for determining whether or not each of the first and second transmission lines fails. The failure detection circuit is provided with a first judgement device for monitoring the second transmission line according to the first communication signal, for resetting a second-transmission-line monitoring state, in which the second transmission line is monitored, in response to the second communication signal and for judging whether or not the second transmission line fails, on the basis of a fact that the second-transmission-line monitoring state continues for a predetermined period of time, and a second judgement device for monitoring the first transmission line according to the second communication signal, for resetting a first-transmission-line monitoring state, in which the first transmission line is monitored, in response to the first communication signal and for judging whether or not the first transmission line fails, on the basis of a fact that the first-transmission-line monitoring state continues for a predetermined period of time.

5 Claims, 15 Drawing Sheets

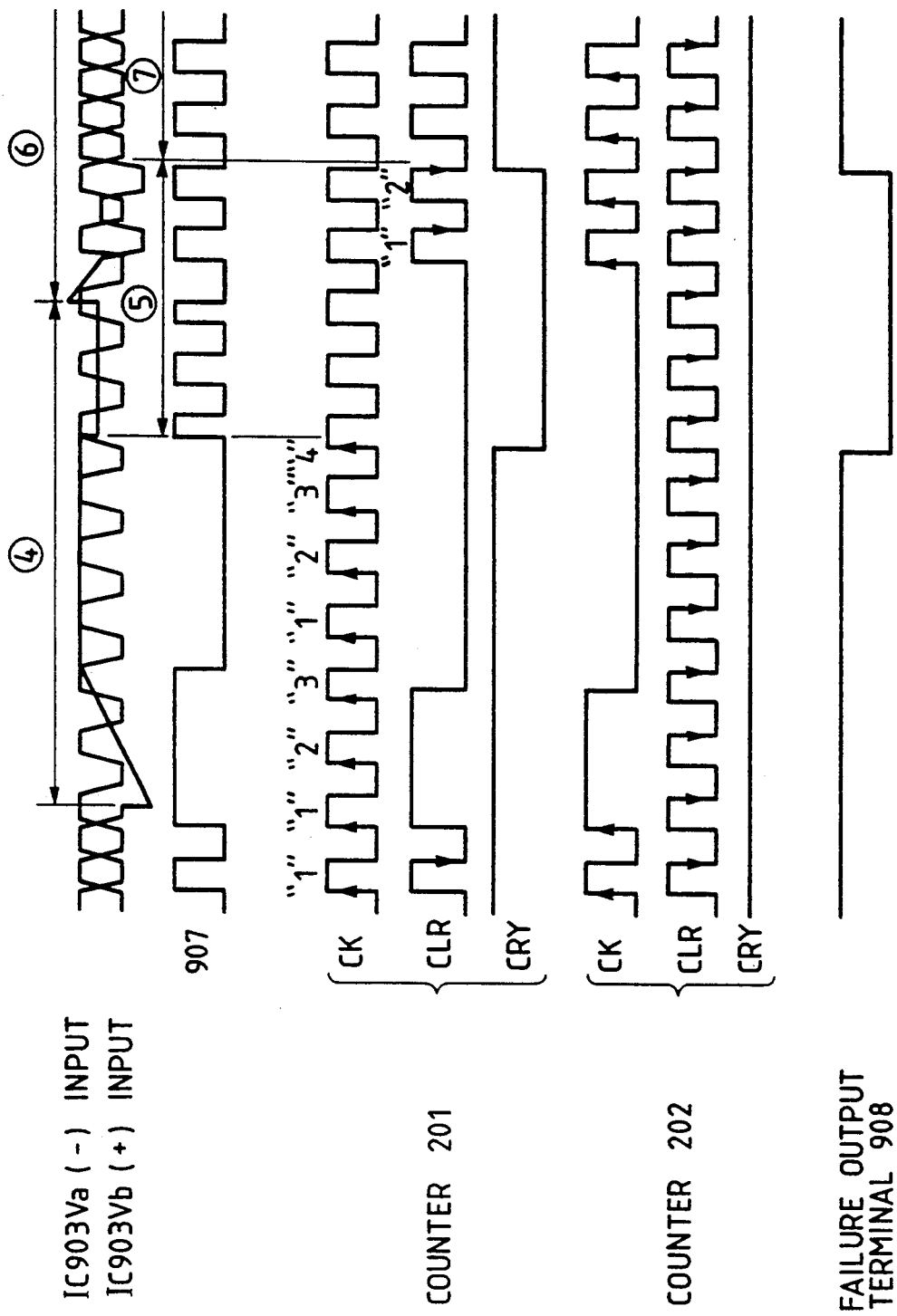

COMMUNICATION APPARATUS WITH FAULT TOLERANCE

BACKGROUND OF THE INVENTION

1. Field of the Invention

This invention relates to a communication apparatus having fault tolerance for use in, for example, a multiplex transmission system for digital communication among balanced type communication apparatuses, each of which employs at least two transmission lines.

2. Description of the Related Art

Various devices to improve reliability in communication have been made for conventional data communication systems. An example of such devices is to let a communication apparatus have fault tolerance, which is the capability of a communication apparatus to externally correctly perform all or part of the predetermined functions without coming to a dead stop even if the performance of the apparatus decreases due to an occurrence of a fault or failure.

In a conventional fault-tolerant balanced type communication apparatus employing two transmission lines (or buses), when the electric potential of one of the transmission lines is fixed at a given value (including zero) due to some cause (namely, the failure of one of the transmission lines), the other of the transmission lines, which can keep sending communication signals normally, is effectively used. This is realized by inserting a capacitor in each of the transmission lines and separating a capacitor and a corresponding transmission line in a d.c. manner. At that time, the d.c. component of the voltage level of a communication signal having passed through a capacitor is removed therefrom, so that the voltage level thereof fluctuates in the vicinity of zero potential and thus may be negative. It is, therefore, necessary to provide a circuit for adding the removed d.c. component to the voltage level of the communication signal after the communication signal passed through the capacitor.

FIG. 1 shows the circuit configuration of the conventional balanced-type communication apparatus. If, for instance, a positive polarity bus 52 fails, the input voltage to the noninverting input terminal (hereunder referred to as the positive polarity input terminal) of a comparator IC501 connected to the positive polarity bus 52 is equal to a d.c. component to be added by a d.c. component addition circuit 54. On the other hand, a d.c. component is added by a d.c. component addition circuit 53 to a communication signal passing through a negative polarity bus 51, which does not fail, by way of a capacitor C501. Thereafter, the communication signal is input to the inverting input terminal (hereunder referred to as the negative polarity input terminal) of the comparator IC501. Further, a modulation of the input communication signal is performed in the comparator IC501 by employing the d.c. component input to the positive polarity input terminal (namely, the noninverting input terminal) thereof as a threshold value. Incidentally, in the d.c. component addition circuit 53, a source voltage Vcc is divided by resistors R501 and R502. Further, a voltage obtained as the result of the division is applied to the negative polarity bus 51 through a resistor 503. Similarly, in the d.c. component addition circuit 54, the source voltage Vcc is divided by resistors R504 and R505. Further, a voltage obtained as the result of the division is applied to the positive polarity bus 52 through a resistor 506.

However, in this conventional system, the d.c. component added to the communication signal passing through the negative polarity bus 51 is not uniquely determined in accordance with the value determined by the d.c. component addition circuit 53. Namely, the d.c. component varies with the duty factor or ratio of the communication signal and with the time having passed since the initiation of an inputting of pulses. This due to the fact that the d.c. component added by the d.c. component addition circuit 53 does not become constant until the capacitor C501 is charged according to a time constant determined by the resistors R501 and R503 and the capacitor 501.

Thus the d.c. component of the communication signal having passed through the capacitor C501 gradually changes until a transient time t passes since the initiation of an inputting of the communication signal to as indicated by a dashed curve in FIG. 2. This results in instability of the threshold value employed in the comparator IC501. Therefore, where the positive polarity bus 52 or the negative polarity bus 51 has a capacitive component, the waveform of the communication signal is deformed. Consequently, the conventional system has a drawback in that there occurs a difference or error between the values of the duty factor respectively measured before and after the demodulation of the communication signal.

As a technical countermeasure for eliminating such a drawback, an improved conventional system, the configuration of which is disclosed in Japanese Unexamined Patent Publication (Kokai Tokkyo Koho) Official Gazette No. 1-261047, has been developed. Namely, as is shown in FIG. 3, a negative polarity bus 71 connecting a comparator IC701 to a capacitor C701 is connected by a non-linear element such as a diode D701 with a positive polarity bus 72 connecting a comparator IC702 to a capacitor C702 in this system. Further, the source voltage Vcc is applied to the anode of the diode D701 through a resistor R702. On the other hand, the cathode of the diode D701 is grounded through a resistor R701. This circuit utilizes the property of a diode that a voltage developed across a diode is nearly constant independent of a current flowing through the diode.

However, the forward voltage of the diode D701 used to connect the negative polarity bus 71 to the positive polarity bus 72 of the conventional system has a temperature characteristic. If, for example, the positive polarity bus 72 fails in a situation where temperature of a working environment varies, the forward voltage Vf of the diode D701 changes and thus the d.c. components of the voltages Vin+ and Vin− applied to the comparator IC701 vary as illustrated in FIG. 4. Incidentally, the voltages Vin+ and Vin− of FIG. 4 are input to the noninverting and inverting input terminals (namely, the positive and negative polarity input terminals) of the comparator IC701, respectively.

Thus the threshold value varies due to, especially, change in the input voltage Vin+. Therefore, this improved conventional system has a defect in that in case where the communication signal is deformed due to distributed capacity of the buses, the pulse width of an output signal of the comparator IC701 changes between $t_1$ and $t_2$ (namely, $t_1 \neq t_2$) after the demodulation as illustrated in FIG. 4. The present invention is created to eliminate such a defect of the conventional system.

It is, accordingly, an object of the present invention to provide a fault tolerant receiver employing balanced type transmission lines, which can correctly perform a demodulation even when one of the transmission lines fails and temperature of a working environment varies.

Further, in a conventional fault-tolerant balanced type communication apparatus employing at least two transmission lines, when the electric potential of one of the transmission lines is fixed at a given value (including zero) due to some cause (namely, when one of the transmission lines fails), reception data can be maintained as long as the other transmission line operates normally, though the anti-noise performance thereof, which is a merit or advantage of the balanced type communication, is degraded.

It is, however, undesirable to leave the fault in communication apparatus. Thus it is necessary to detect which of the transmission lines fails and to perform some countermeasures (for instance, to inform a user of the detected transmission line failure).

FIG. 5 shows an example of a failure detection circuit for detecting which of the transmission lines fails, which is disclosed in German Laid-open Patent Application (Offenlegungsschrift) DE 3826774 A1.

In the circuit of FIG. 5, a counter 24 is periodically incremented and is reset in response to a demodulation signal sent from a comparator 20. A failure of a negative polarity signal line 41 or of a positive polarity signal line 42 is detected by this counter 24 and a central processing unit (hereunder abbreviated as CPU) 25.

Namely, in the circuit shown in FIG. 5, when the negative and positive polarity signal lines 41 and 42 are normal, a demodulation signal is output from the comparator 20. Thus the counter 24 is reset. In contrast, when one of the negative and positive polarity signal lines 41 and 42 fails, the comparator 20 does not output a demodulation signal. Hence, the counter 24 is kept incremented periodically.

Further, when the value of the counter 24 reaches a predetermined amount, the counter 24 outputs an error signal to the CPU 25. Then, the CPU 25 turns on an analog switch 21 by way of a status register 26. Thereupon, a signal having a prescribed voltage level of Vcc/2 (volts (V)) is supplied to the positive polarity signal line 42 through a voltage follower 23 and further is input to the noninverting input terminal (namely, the positive polarity input terminal) of the comparator 20. As the result, the counter 24 is reset when a demodulation is performed by the counter 24. Thereby, the CPU 25 can detect a failure of the positive polarity signal line 42.

However, in case where a demodulation is not effected by the comparator 24 yet, the counter 24 is kept incremented again. Thereafter, when the value of the counter 24 reaches the predetermined one, the counter 24 outputs an error signal to the CPU 25 again. Subsequently, the CPU 25 turns on an analog switch 22 by way of the status register 26. Then, a signal having the prescribed voltage level of Vcc/2 (V) is fed through the voltage follower 23 to the negative polarity signal line 41 and further is input to the inverting input terminal (namely, the negative polarity input terminal) of the comparator 20.

At that time, if a demodulation is performed by the comparator 20, the counter 24 is reset. Thereby, the CPU 25 can detect a failure of the negative polarity signal line 41.

However, in case of the conventional detection circuit, when a detection of a failure in the negative polarity signal line 41 and the positive polarity signal line 42 is effected, it is necessary to subsequently perform failure detection operations of the counter 24 and the CPU 25 twice. This is because a selection of the analog switches 21 and 22 are controlled by the CPU 25. Thus the conventional communication apparatus provided with this failure detection circuit has a drawback in that it takes time to determine which of the negative and positive polarity buses fails. The present invention is intended to eliminate this drawback of the conventional communication apparatus.

It is, therefore, another object of the present invention to provide a fault-tolerant communication apparatus employing balanced type transmission lines, which can perform a demodulation even if one of the transmission lines fails, and can reduce time required for detecting a failure in the transmission lines.

SUMMARY OF THE INVENTION

To achieve the foregoing object and in accordance with the present invention, there is provided a communication apparatus (hereunder referred to as a first communication apparatus) with fault tolerance, which has balanced type transmission lines composed of first and second transmission lines respectively transmitting first and second complementary communication signals of different polarity, a transmission device for transmitting the first and second complementary communication signals through the balanced type transmission lines, a reception device for receiving the first and second complementary communication signals through the balanced type transmission lines and for receiving contents of a communication based on the complementary relation between the first and second communication signals, and a failure detection circuit for determining whether or not each of the first and second transmission lines fails, wherein the failure detection circuit comprises first judgement means for monitoring the second transmission line according to the first communication signal, for resetting a second-transmission-line monitoring state, in which the second transmission line is monitored, in response to the second communication signal and for judging whether or not the second transmission line fails, on the basis of a fact that the second-transmission-line monitoring state continues for a predetermined period of time, and second judgement means for monitoring the first transmission line according to the second communication signal, for resetting a first-transmission-line monitoring state, in which the first transmission line is monitored, in response to the first communication signal and for judging whether or not the first transmission line fails, on the basis of a fact that the first-transmission-line monitoring state continues for a predetermined period of time.

Thus, in the first judgement means, the second-transmission-line monitoring state, in which the second transmission line is monitored according to the first communication signal, is reset in response to the second communication signal. For example, in case where the second transmission line fails, the second-transmission-line monitoring state is not reset but continues. When the second-transmission-line monitoring state continues for a predetermined period of time, it is decided that the second transmission line fails.

Similarly, in the second judgement means, the first-transmission-line monitoring state, in which the first transmission line is monitored according to the second communication signal, is reset in response to the first communication signal. For instance, in case where the first transmission line fails, the first-transmission-line monitoring state is not reset but continues. When the first-transmission-line monitoring state continues for a predetermined period of time, it is decided that the first transmission line fails.

Thereby, it can be decided by the first judgement means whether or not the second transmission line fails. Further, it can be decided by the second judgement means whether or not the first transmission line fails. Moreover, these decisions can be made in parallel with each other. Consequently, the time required for determining whether or not each of the transmission lines fails can be substantially reduced.

Further, in accordance with an embodiment of the present invention, there is provided a communication apparatus (hereunder referred to as a second communication apparatus) with fault tolerance, which includes elements comprising the first communication apparatus, wherein the first judgement means comprises first counting means for counting the number of times of generation of the first communication signal, for resetting the counted number of times of generation of the first communication signal to zero in response to the second communication signal and for outputting a signal indicating a failure of the second transmission line in case where the counted number of times of generation of the first communication signal reaches a predetermined value, wherein the second judgement means comprises second counting means for counting the number of times of generation of the second communication signal, for resetting the counted number of times of generation of the second communication signal to zero in response to the first communication signal and for outputting a signal indicating a failure of the first transmission line in case where the counted number of times of generation of the second communication signal reaches a predetermined value.

Thus, in the first counting means, the counted number of times of generation of the first communication signal is reset to zero in response to the second communication signal. For example, in case where the second transmission line fails, the first counting means is not reset but continues counting the number of times of generation of the first communication signal. When the counted number of times of generation of the first communication signal reaches a predetermined value, the first counting means outputs a signal indicating a failure of the second transmission line.

Similarly, in the second counting means, the counted number of times of generation of the second communication signal is reset to zero in response to the first communication signal. For example, in case where the first transmission line fails, the second counting means is not reset but continues counting the number of times of generation of the second communication signal. When the counted number of times of generation of the second communication signal reaches a predetermined value, the second counting means outputs a signal indicating a failure of the first transmission line.

Thereby, it can be decided by the first counting means whether or not the second transmission line fails. Further, it can be decided by the second counting means whether or not the first transmission line fails. Moreover, these decisions can be made in parallel with each other. Consequently, the time required for determining whether or not each of the transmission lines fails can be substantially reduced.

Moreover, in accordance with another embodiment of the present invention, there is provided a communication apparatus (hereunder referred to as a third communication apparatus) with fault tolerance, which includes the elements comprising the first or second communication apparatus, wherein data represented by each of the first and second communication signals is a combination of data of 1 and 0, wherein each of the balanced type transmission lines is connected to demodulation means for receiving the first and second communication signals and for outputting a demodulation output signal, wherein first and second capacitors are inserted in the first and second transmission lines, respectively, wherein a first voltage clamping circuit for clamping a voltage level of the first communication signal, which has passed through the first capacitor and should be input to the demodulation means, to a predetermined voltage level represented by a part of the first communication signal corresponding to data of 0, wherein a second voltage clamping circuit for clamping a voltage level of the second communication signal, which has passed through the second capacitor and should be input to the demodulation means, to a predetermined voltage level represented by a part of the second communication signal corresponding to data of 0, wherein each of the first and second voltage clamping circuits changes the predetermined voltage according to a result of determination made by the failure detection circuit.

Thus, a voltage level of a reception signal transmitted on a transmission line, in which a failure occurs, can be reduced.

Furthermore, in accordance with a further embodiment of the present invention, there is provided a communication apparatus (hereunder referred to as a fourth communication apparatus) with fault tolerance, which includes the elements comprising the third communication apparatus, wherein each of the first and second voltage clamping circuits has a temperature compensation circuit and clamps the voltage level of the corresponding communication signal input to the demodulation means by using the temperature compensation circuit.

Thus, even when temperature of a working environment varies, a demodulation can accurately be achieved.

Additionally, in accordance with still another embodiment of the present invention, there is provided a communication apparatus with fault tolerance, which includes the elements comprising the fourth communication apparatus, wherein each of the temperature compensation circuits comprises a PNP transistor and an NPN transistor, which are complementary to each other, and a power supply portion for supplying power to the PNP and NPN transistors, wherein the PNP transistor and the NPN transistor are connected in such a manner that change in base-emitter voltage of the PNP transistor depending on temperature cancels change in base-emitter voltage of the PNP transistor depending on temperature.

Thus, even when temperature of a working environment changes, the predetermined voltage level, to which the voltage level of the communication signal is clamped by the voltage clamping circuit, can always be made constant.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 16 is a timing chart for illustrating an operation of a failure detection circuit and states of input signals to a demodulator of the embodiment of FIG. 15 in case where a negative signal line thereof fails.

DETAILED DESCRIPTION OF THE PREFERRED EMBODIMENTS

Hereinafter, preferred embodiments of the present invention will be described in detail by referring to the accompanying drawings.

Figure 6:
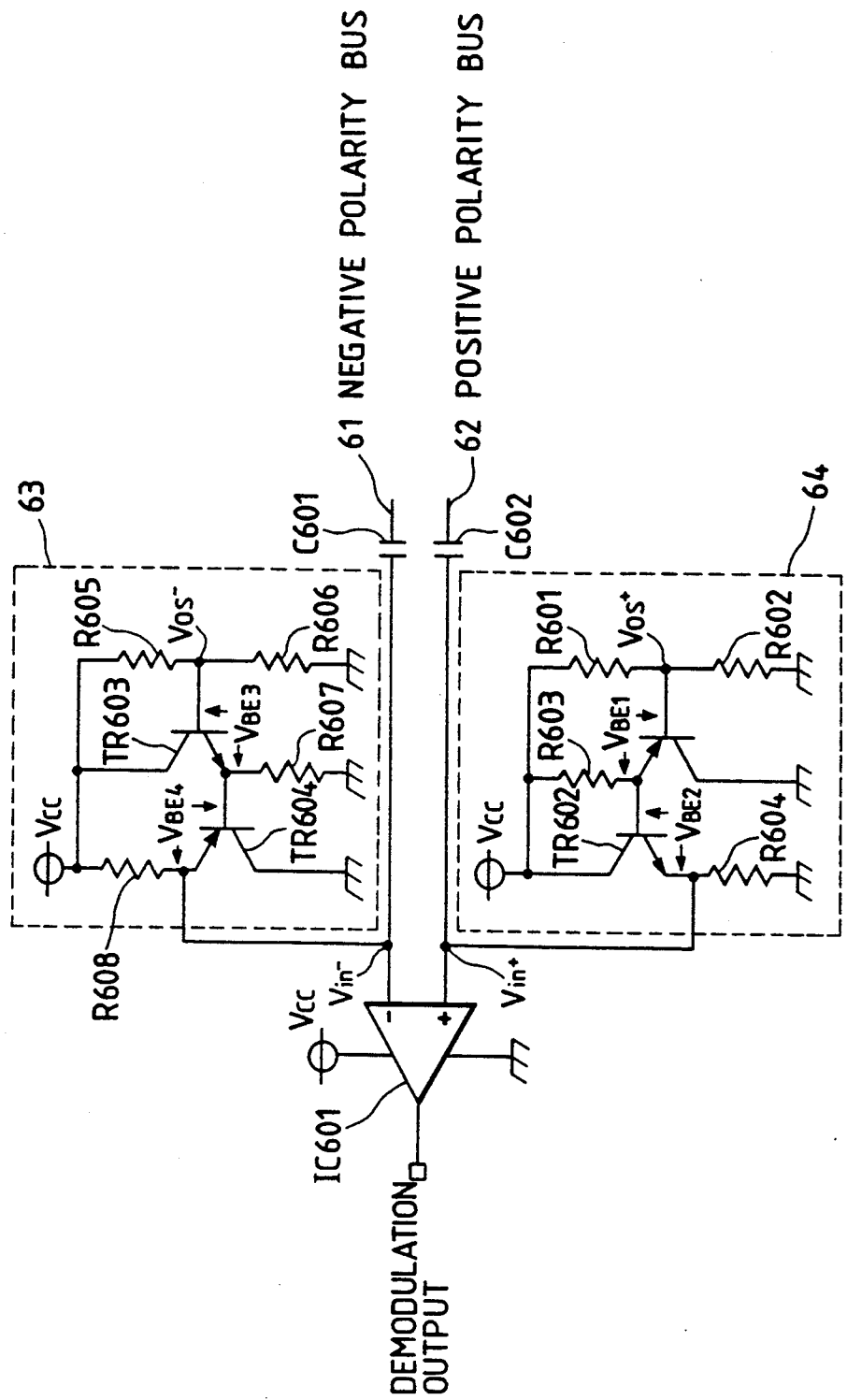
FIG. 6 is a circuit diagram of an embodiment of the present invention.

FIG. 6 is a circuit diagram for illustrating the configuration of an embodiment (hereunder referred to as a first embodiment) of the present invention.

In FIG. 6, the negative polarity bus 61 and the positive polarity bus 62 are connected to the inverting input terminal (namely, the negative polarity input terminal) and the noninverting input terminal (namely, the positive polarity input terminal) of a comparator IC601, respectively. Further, a capacitor C601 and a capacitor C602 are inserted in the negative polarity bus 61 and the positive polarity bus 62, respectively. The negative polarity bus 61 and the positive polarity bus 62 serve as balanced type transmission lines.

To this negative polarity bus 61, a voltage clamping circuit 63 is connected for adding a d.c. component to a communication signal which has passed through the capacitor C601.

Namely, three circuits (i.e., a circuit in which resistors R605 and R606 are in series with each other, another circuit in which a transistor TR603 is in series with a resistor R607, and a further circuit in which a resistor R608 is in series with a transistor TR604) are in parallel with one another. Further, a terminal of this parallel circuit is connected to a source voltage Vcc, and the other terminal of the parallel circuit is grounded.

Moreover, a fraction of the source voltage Vcc, which is obtained from the intermediate point between the resistors R605 and R606, is set as an offset voltage $Vos^-$ corresponding to the inverting input terminal of the comparator IC601 which serves as a demodulation means. This offset voltage $Vos^-$ is used as a base voltage of an NPN transistor TR603. Thus the NPN transistor TR603 supplies a voltage (namely, an emitter voltage thereof), which is lower than the offset voltage $Vos^-$ by a base-emitter voltage $V_{BE3}$, from the emitter thereof to a PNP transistor TR604 as a base voltage of the transistor TR604. Subsequently, a voltage, which is higher than the emitter voltage ($Vos^- - V_{BE3}$) of the transistor TR603 by a base-emitter voltage $V_{BE4}$ of the transistor TR604, is applied from the emitter of the transistor TR604 to the negative polarity bus 61. Incidentally, the PNP transistor TR603 is complementary to the transistor TR604.

Further, to the positive polarity bus 62, a voltage clamping circuit 64 is connected for adding a d.c. component to a communication signal which has passed through the capacitor C601.

Namely, three circuits (i.e., a circuit in which resistors R601 and R602 are in series with each other, another circuit in which a transistor TR601 is in series with a resistor R603, and a further circuit in which a resistor R604 is in series with a transistor TR602) are in parallel with one another. Further, a terminal of this parallel circuit is connected to the source voltage Vcc, and the other terminal thereof is grounded.

Moreover, a fraction of the source voltage Vcc, which is obtained from the intermediate point between the resistors R601 and R602, is set as an offset voltage $Vos^+$ corresponding to the inverting input terminal of the comparator IC601 which serves as a demodulation means. This offset voltage $Vos^+$ is used as a base voltage of an PNP transistor TR601. Then, the PNP transistor TR601 supplies a voltage (namely, an emitter voltage thereof), which is higher than the offset voltage Vos+ by a base-emitter voltage $V_{BE1}$, from the emitter thereof to a NPN transistor TR602 as a base voltage of the transistor TR602. Subsequently, a voltage, which is lower than the emitter voltage (Vos+ +$V_{BE1}$) of the transistor TR60₁ by a base-emitter voltage $V_{BE4}$ of the transistor TR602, is applied from the emitter of the transistor TR602 to the positive polarity bus 62. Incidentally, the NPN transistor TR602 is complementary to the PNP transistor TR601.

Furthermore, the comparator IC601 performs a comparison and demodulation of the communication signals input to the inverting and noninverting input terminals thereof.

Next, the operation of the first embodiment of the present invention will be described hereinbelow.

To begin with, it will be described hereinafter the operation of the first embodiment of the present invention in case where both the negative polarity bus 61 and the negative polarity bus 62 function normally.

Figure 7:
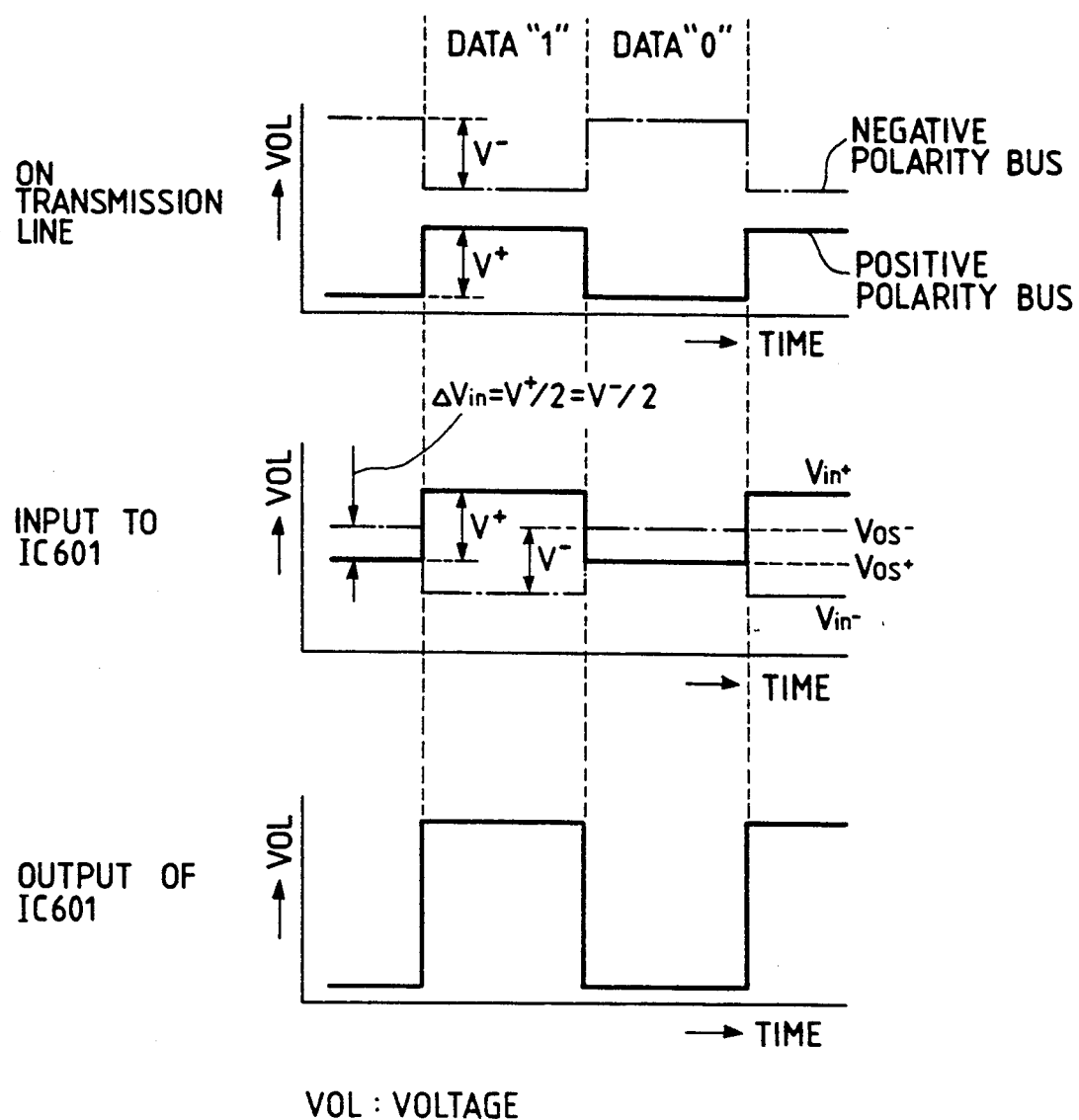
FIG. 7 is a waveform chart for illustrating the waveforms of input and output signals of a comparator of the embodiment of FIG. 6 and that of a signal passing through a transmission line thereof.

First, the operation of the first embodiment of the present invention will be described in a state in which communication signals representing data "0" as illustrated in FIG. 7 are applied to both of the negative polarity bus 61 and the positive polarity bus 62 (namely, voltage levels respectively corresponding to data "0" is applied to the buses 61 and 62).

As is seen from FIGS. 6 and 7, in case where the communication signal indicating data "0", an input voltage Vin+ to the noninverting input terminal of the comparator IC601 is equal to a voltage obtained by subtracting the base-emitter voltage $V_{BE2}$ of the transistor TR602 from a sum of the base-emitter $V_{BE1}$ of the transistor TR601 and the offset voltage Vos+, which corresponds to the noninverting input terminal thereof and is the fraction of the source voltage Vcc obtained from the intermediate point between the resistors R601 and R602. Namely, $$Vin^+ = Vos^+ + V_{BE1} - V_{BE2} \qquad (1)$$

Further, an input voltage Vin− to the inverting input terminal of the comparator IC601 is equal to a voltage obtained by adding the base-emitter voltage $V_{BE4}$ of the transistor TR604 to a difference obtained as a result of subtracting the base-emitter $V_{BE3}$ of the transistor TR603 from the offset voltage Vos−, which corresponds to the inverting input terminal thereof and is the fraction of the source voltage Vcc obtained from the intermediate point between the resistors R605 and R606. Namely, $$Vin^- = Vos^- - V_{BE3} + V_{BE4} \qquad (2)$$

Here, it is assumed that $V_{BE}$-temperature characteristic of the transistor TR601 is substantially the same as $V_{BE}$-temperature characteristic of the transistor TR602 and that $V_{BE}$-temperature characteristic of the transistor TR603 is substantially the same as (or complementary to) $V_{BE}$-temperature characteristic of the transistor TR604. In such a case, in the voltage clamping circuit 64, the difference between the base voltage Vos+ of the transistor TR601 and the emitter voltage of the transistor TR602 is substantially equal to 0. Thus the voltage Vin+ can be held to nearly be equal to the voltage Vos+. Namely, Vin+ ≈ Vos+

Furthermore, it is the same with the relation between the base voltage Vos− of the transistor TR603 and the emitter voltage of the transistor TR604 of the voltage clamping circuit 63, because the transistor TR603 is complementary to the transistor TR604.

Therefore, in case where the communication signal representing data "0" is applied to each of the buses, the communication signal having the voltage level Vin+ represented by the following equation and the communication signal having the voltage Vin− represented by the following equation are input to the noninverting input terminal and the inverting input terminal of the comparator IC601, respectively.

$$Vin^+ \approx Vos^+ \qquad (3)$$

$$Vin^- \approx Vos^- \qquad (4)$$

Then, in the comparator IC601, the voltage Vin+ input to the noninverting input terminal thereof and the voltage Vin− input to the inverting input terminal thereof are compared with each other by using the input voltage Vin+ as a threshold value. Further, as a result of the comparison, a signal having a low level (hereunder referred to as an L-signal) is output from the comparator IC601.

Next, will be described hereunder an operation of the first embodiment in a state in which communication signals representing data "1" as illustrated in FIG. 7 are applied to both of the negative polarity bus 61 and the positive polarity bus 62.

As is seen from FIGS. 6 and 7, in case where the communication signal indicating data "1", an input voltage Vin+ to the noninverting input terminal of the comparator IC601 is equal to a voltage obtained by adding an amplitude voltage V+ of the communication signal passing through the positive polarity bus 62 to the voltage represented by the equation (3). Namely, $$Vin^+ = Vos^+ + V^+ \qquad (5)$$

At that time, the amplitude voltage V+ is sufficiently higher than the base-emitter voltage $V_{BE2}$ of the transistor TR602, so that the emitter voltage of the transistor TR602 becomes higher than the base voltage thereof. As the result, the transistor TR602 is turned off and the collector current thereof is cut off. Then, the capacitor C602 is discharged through the resistor 604. Thus the input voltage to the noninverting input terminal of the comparator IC601 as expressed by the equation (5) gradually drops.

At that time, a discharging speed of the capacitor depends on the time constants of the capacitor C601 and the resistor R604. Therefore, in case where the signals respectively representing data "1" are successively applied to the bus, the resistor R604 is selected in such a manner that the voltage represented by the equation (5) can be maintained and that a normal demodulation can be performed in the comparator IC601.

Similarly, the input voltage Vin− to the inverting input terminal of the comparator IC601 becomes equal to a voltage obtained by subtracting an amplitude voltage V− of the communication signal passing through the negative polarity bus 1 from the voltage represented by the equation (4). Namely, $$Vin^- = Vos^- - V^- \qquad (6)$$

At that time, the amplitude voltage V⁻ is sufficiently higher than the base-emitter voltage $V_{BE4}$ of the transistor TR604, so that the transistor TR604 is turned off and the collector current thereof is cut off. Incidentally, the resistor R608 is selected similarly as in case of the resistor R604.

Thus, in case where the communication signal representing data "1" is applied to each of the buses, the communication signal having the voltage expressed by the equation (5) is input to the noninverting input terminal of the comparator IC601, and the communication signal having the voltage expressed by the equation (6) is input to the noninverting input terminal thereof.

Thereafter, in the comparator IC601, the voltage Vin⁺ input to the noninverting input terminal thereof and the voltage Vin⁻ input to the inverting input terminal thereof are compared with each other by using the input voltage Vin⁺ as a threshold value. Further, as a result of the comparison, a signal having a high level (hereunder referred to as an H-signal) is output from the comparator IC601.

Incidentally, the difference ΔVin between the offset voltage Vos⁺ corresponding to the noninverting input terminal of the comparator IC601 and the offset voltage Vos₋ corresponding to the inverting input terminal thereof (namely, ΔVin=Vos⁻−Vos⁺) is set to be lower than the amplitude voltage V⁺ (=V⁻), for the purpose of using the voltage level of the communication signal passing through one of the buses, which fails, as a threshold value, reliably and appropriately. For example, in the first embodiment of the present invention, the difference ΔVin is set to be half of the amplitude voltage. Namely, ΔVin =V⁺/2=V⁻/2.

Next, will be described hereinbelow an operation of the first embodiment in case where one of the negative polarity bus 61 and the positive polarity bus 62 fails.

If, for instance, the electric potential of the positive polarity bus 62 is fixed at a given level, which may be zero (namely, the bus 62 fails), the communication to be applied to the positive polarity bus 62 is the signal representing data "0" because the noninverting input terminal of the comparator IC601 is electrically isolated from the positive polarity bus 62 in a d.c. manner. Thus the input voltage Vin⁺ to the noninverting input terminal of the comparator IC601 becomes equal to the offset voltage Vos⁺ in case where the communication signal representing data "0" is input thereto. Further, this input voltage is retained.

Figure 8:
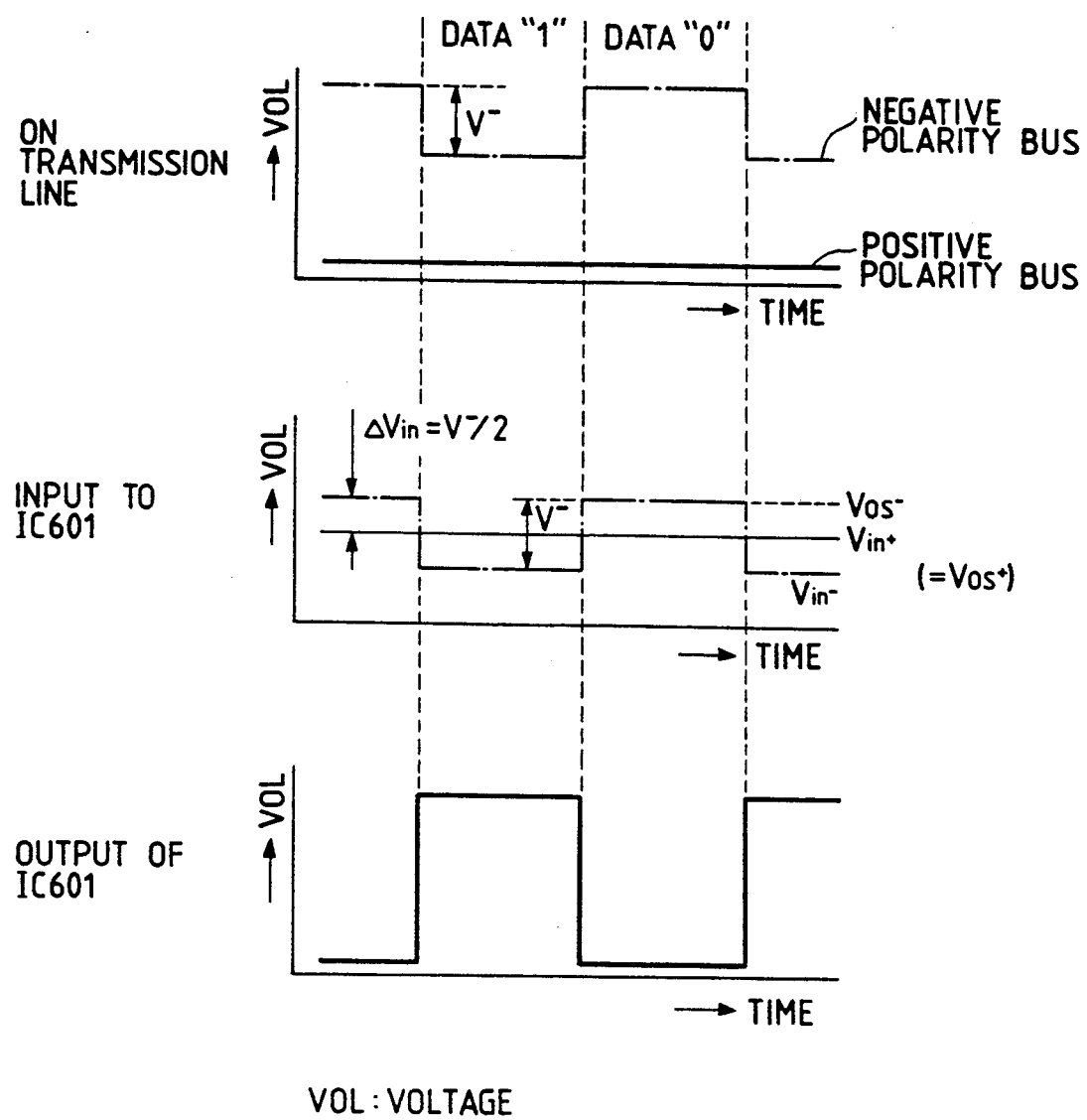
FIG. 8 is a waveform chart for illustrating the waveforms of input and output signals of a comparator of the embodiment of FIG. 6 and that of a signal passing through a transmission line thereof in case where a positive polarity bus thereof fails.

Further, in case where the negative polarity bus 61 normally functions when the positive polarity bus 62 fails as described above, the communication signal having voltage levels Vos⁻ respectively corresponding to data "0" and "1" as shown in FIG. 8 is input to the inverting input terminal of the comparator IC601.

Then, in the comparator IC601, the input voltage Vin⁺ to the positive input terminal thereof (namely, the offset voltage Vos⁺) and the input voltage Vin⁻ to the inverting input terminal thereof are compared with each other by using the offset voltage level Vos⁺ as a threshold value. Thus L-level and H-level signals are output from the comparator IC601.

As above described, the difference ΔVin between the offset voltages Vos⁺ and Vos⁻ respectively corresponding to the noninverting and inverting input terminals of the comparator IC601 (namely, ΔVin=Vos⁻ −Vos⁺) is set to be equal to V⁻/2. Therefore, if the positive polarity bus 2 fails and the input voltage to the noninverting input terminal of the comparator IC601 becomes equal to Vos⁺, the following relation is held.

$$Vos^+ = Vos^- - \Delta Vin = Vos^- - V^-/2.$$

Thus, as illustrated in FIG. 8, the voltage level Vos⁺ can serve as a threshold value for a demodulation of the input voltage Vin⁻ to the inverting input terminal of the comparator IC601, which varies between Vos⁻ and (Vos⁻ −V⁻).

Thereby, if the positive polarity bus 62 fails, a demodulation of the input voltage Vin⁻ to the inverting input terminal of the comparator IC601 can be performed by employing the offset voltage level Vos⁺ corresponding to the noninverting input terminal thereof as a threshold value. Consequently, the resultant demodulation waveform of such a case is substantially the same as the demodulation waveform obtained in a case where both of the negative polarity bus 61 and the positive polarity bus 62 function normally.

As above stated, in the first embodiment, if the electric potential of the positive polarity bus 62 is fixed at a given level, which may be the level of zero potential, a d.c. component of the communication signal lost during a transmission thereof can be restored by using the emitter voltage of the transistor TR602 of the voltage clamping circuit 64. Consequently, a communication signal having a stable voltage waveform can be transmitted to the noninverting input terminal of the comparator IC601 at all times.

Additionally, when the temperature of the working environment changes, the fault tolerant receiver with the above described configuration can perform an exact demodulation of a communication signal. Namely, the transistors TR601 and TR602 are complementary to each other, so that change in the base-emitter voltage $V_{BE1}$ of the transistor TR601 is canceled by change in the base-emitter voltage $V_{BE2}$. Thus a voltage level, which is very close to the offset voltage level Vos⁺, can be obtained at the noninverting input terminal of the comparator IC601 at all times. This is the same with the offset voltage Vos⁻ of the communication signal input to the inverting input terminal of the comparator IC601.

Hereinafter, another embodiment (hereunder referred to as a second embodiment) of the present invention (namely, a communication driver/receiver embodying the present invention) will be described.

Figure 9:
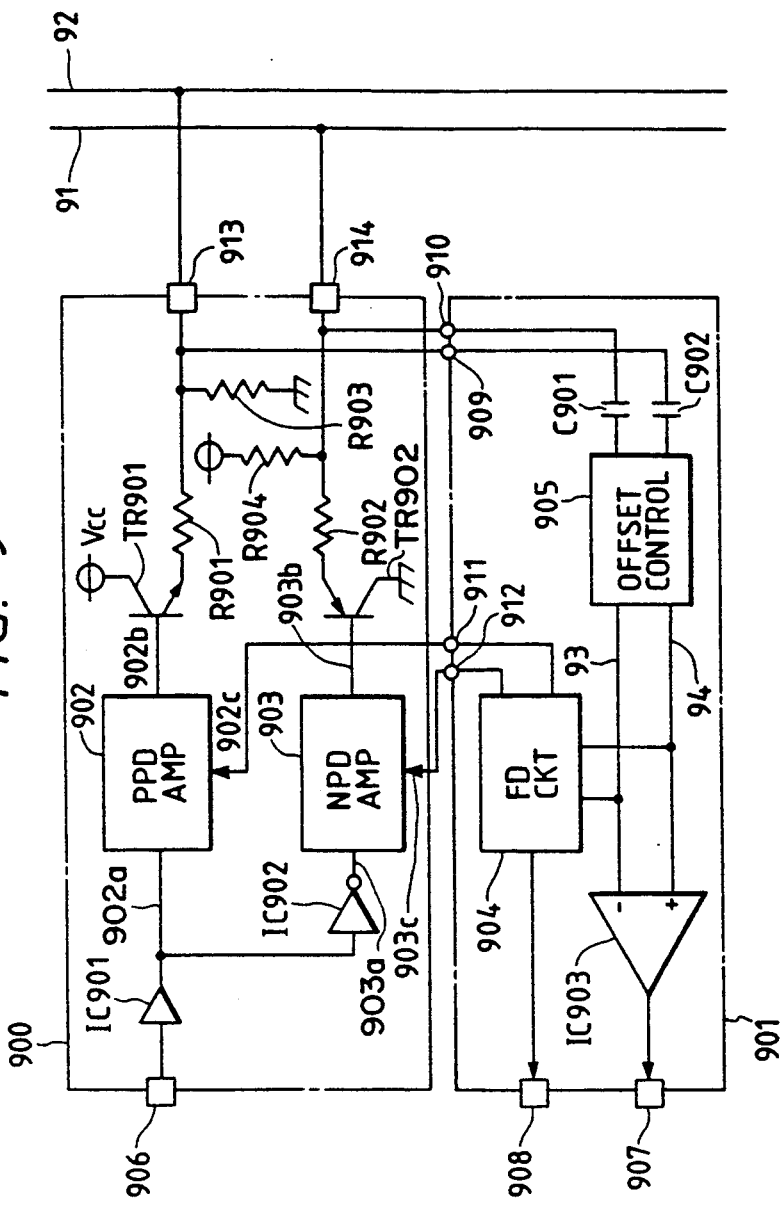
FIG. 9 is a circuit diagram for illustrating the configuration of another embodiment of the present invention.

FIG. 9 is a schematic diagram for illustrating the configuration of this communication driver/receiver embodying the present invention. A driver 900 of FIG. 9 for transmitting data, which serves as a transmission device, is constructed as will be described hereinbelow.

Namely, an input buffer IC901, to which a signal from a transmission input terminal 906 is input, outputs an output signal to a positive polarity driver amplifying portion 902 and a logical inverter IC902.

The positive polarity driver amplifying portion 902 receives a signal from the input buffer IC901 at a terminal 902a thereof and a control signal from a failure detection circuit 904 (to be described later) at a terminal 902c thereof. Subsequently, the portion 902 changes the gain thereof in accordance with the control signal and amplifies the signal received from the input buffer and then outputs the amplified signal from a terminal 902b thereof.

An NPN transistor TR901 is connected to the terminal 902b of the positive polarity driver amplifying portion at the base thereof. A signal from the positive polarity driver amplifying portion 902 is output from a positive polarity signal output terminal 913 through an emitter follower to a positive polarity signal line 92 which corresponds to the second transmission line.

Incidentally, a resistor R901 which serves as a protection resistor is connected to the emitter of the transistor TR901. Further, a source voltage Vcc (5 volts (V) in case of this embodiment) is supplied to the collector of the transistor TR901. Further, a pull-down resistance R903 is provided for securing a reference electric potential (GND) of the positive polarity signal line 92. A terminal of the pull-down resistance R903 is connected to an intermediate point between the resistor R901 and the positive polarity signal line 92. The other terminal of the resistance R903 is grounded.

Further, the logical inverter IC902 which has received the communication signal from the input buffer IC901 inverts logical data represented by the received communication and outputs a signal representing the inverted data.

Further, the negative polarity driver amplifying portion 903, which has received the signal from the logical inverter IC902 (namely, the signal representing data obtained by inverting the logical data from the input buffer IC901) at a terminal 903a, receives a control signal from the failure detection circuit 904 (to be described later) at a terminal 903c thereof and changes the gain thereof in accordance with the control signal. Then, the portion 903 amplifies the received signal and outputs the amplified signal from a terminal 903b thereof.

A PNP transistor TR902 is connected to the terminal 903b of a negative polarity driver amplifying portion 903 at the base thereof. A signal from the negative polarity driver amplifying portion 903 is output from a negative polarity signal output terminal 914 through an emitter follower to a negative polarity signal line 91 which corresponds to the first transmission line.

Incidentally, a resistor R902 which serves as a protection resistor is connected to the emitter of the transistor TR902. Further, the collector of the transistor TR902 is connected to ground. Further, a pull-up resistance R904 is provided for securing electric current to the negative polarity signal line 91. A terminal of the pull-up resistance R904 is connected to an intermediate point between the resistor R902 and the negative polarity signal line 91. The other terminal of the resistance R904 is connected to a power supply.

Next, a receiver 901 of FIG. 9 for receiving data, which serves as a receiving device, is constructed as will be described hereinbelow.

Capacitors C901 and C902 are provided in a transmission line 93 connected to the inverting input terminal of the demodulator IC903 and another transmission line 94 connected to the noninverting input terminal thereof, respectively. The capacitors C901 and C902 are coupling capacitors for performing what is called an AC coupling of the circuit 901 and the signal lines (namely, for connecting terminals 909 and 910 of the circuit 901 to the negative polarity signal line 91 and the positive polarity signal line 92, respectively).

An offset control circuit 905 is a circuit for adding a d.c. component to the communication signal, from which the d.c. component is removed by the coupling capacitors C901 and C902. The demodulator IC903 receives and demodulates the communication signal, to which the d.c. component is added by the offset control circuit 905, and outputs a resultant demodulation signal to a reception output signal 907.

Further, the failure detection circuit 904 is used for determining whether or not each of transmission lines 93 and 94 connected to the demodulator IC903 fails, and for changing the gains of the positive polarity driver amplifying portion 902 and the negative polarity driver amplifying portion 903 through terminals 911 and 912 according to a result of the determination and for outputting a signal representing the result of the determination to a failure output terminal 908.

Next, the practical configurations of the failure detection circuit 904 and the offset control circuit 905 of the receiver 901 will be described by referring to FIG. 10.

Figure 10:
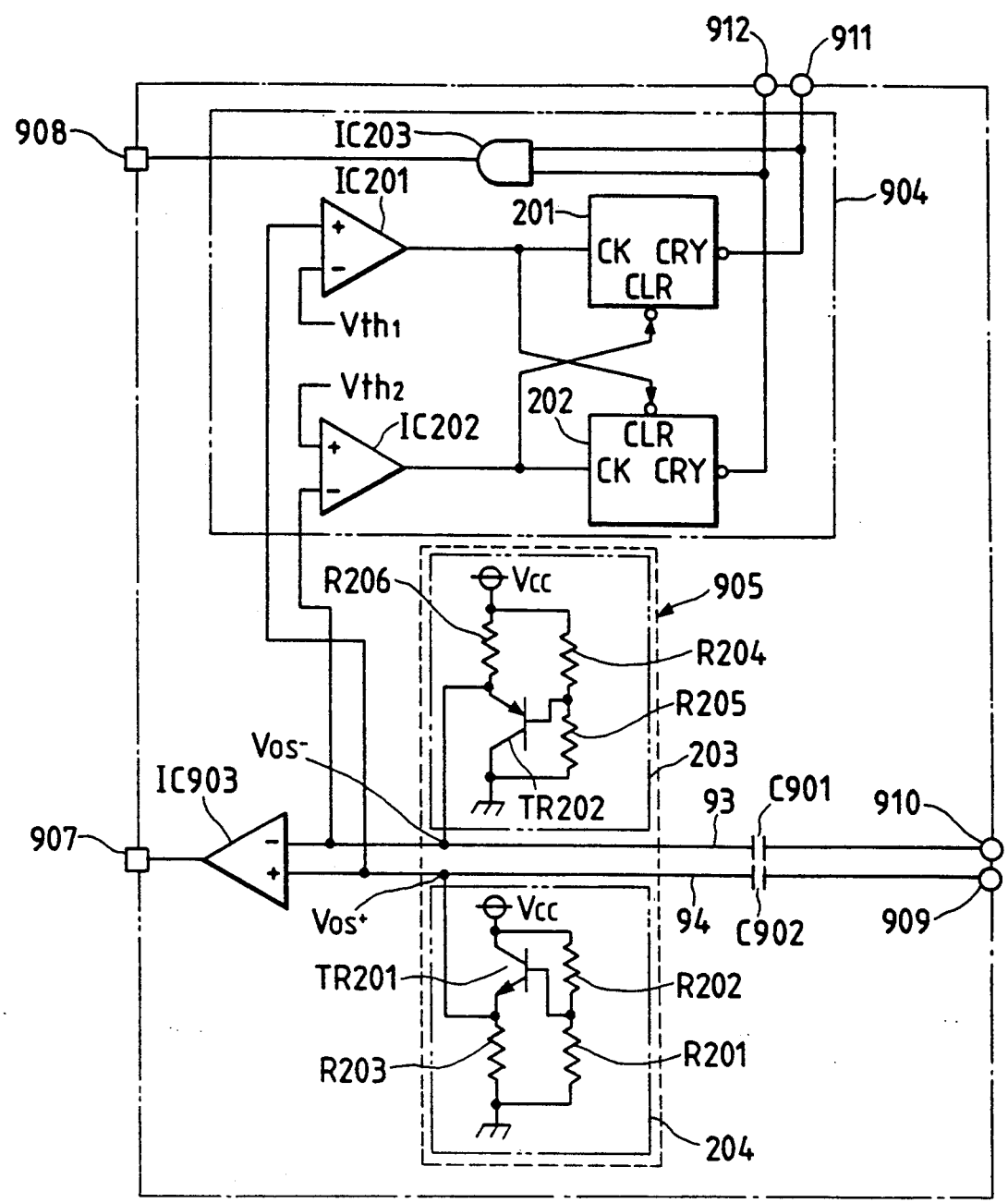
FIG. 10 is a diagram for showing the detailed construction of a failure detection circuit and an offset control circuit of the embodiment of FIG. 9.

As shown in FIG. 10, the offset control circuit 905 is constructed by voltage clamping circuits 203 and 204 to be described later.

The voltage clamping circuit 203 is connected to the transmission line 93 and is a parallel circuit composed of two circuits (namely, a circuit, in which resistors R204 and R205 are in series with each other, and another circuit in which a resistor R206 and a PNP transistor TR202 are in series with each other) connected in parallel with each other. A terminal of this parallel circuit is connected to the source voltage Vcc. Further, the other terminal of this parallel circuit is grounded.

Moreover, a fraction of the voltage Vcc, which is obtained from the intermediate point between the resistors R204 and R205, is applied to the base of the transistor TR202. Furthermore, the transmission line 93 is connected to the emitter of the transistor TR202.

Meanwhile, the voltage clamping circuit 204 is connected to the transmission line 94. As shown in FIG. 10, in the circuit 204, a circuit having resistors R202 and R201 connected in series with each other is connected in parallel with another circuit having an NPN transistor TR201 and a resistor R203 connected in series with each other. The circuit 204 has a terminal connected to the source voltage Vcc and the other terminal which is grounded.

Further, a fraction of the voltage Vcc, which is obtained from the intermediate point between the resistors R202 and R201, is applied to the base of the transistor TR201. Furthermore, the transmission line 94 is connected to the emitter of the transistor TR201.

When a communication signal representing logical data "0" is applied to a transmission input terminal 906 of the driver 900 (namely, when the driver is in a state in which a communication is practically stopped), a d.c. component is added to the transmission line 93 or 94 of the receiver 901. Namely, the d.c. component to be added to the transmission line 94 (i.e., an input voltage to the noninverting input terminal of the demodulator IC903) is a specific voltage of Vos+ which is lower than the fraction of the voltage Vcc obtained from the intermediate point between the resistors R201 and R202 by the emitter-base voltage of the transistor TR201. Further, the d.c. component to be added to the transmission line 93 (i.e., an input voltage to the inverting input terminal of the demodulator IC903) is a specific voltage of Vos− which is higher than the fraction of the voltage Vcc obtained from the intermediate point between the resistors R204 and R205 by the emitter-base voltage of the transistor TR202.

The failure detection circuit 904 is constructed as follows.

Namely, the noninverting input terminal of a buffer IC201 is connected to the transmission line 94, and a threshold voltage V$_{th1}$ is input to the inverting input terminal thereof. Further, a threshold voltage V$_{th2}$ is input to the noninverting input terminal of a buffer IC202, and the inverting input terminal thereof is connected to the transmission line 93. Moreover, each of the buffers IC201 and IC202 converts the amplitude of the corresponding communication signal passing through the corresponding transmission line to an amplitude of the signal, which is suitable for the internal circuit of the failure detection circuit 904.

A counter 201 corresponding to the first counting means is incremented in response to a leading edge of an output signal of the buffer IC201 received at a terminal Ck (i.e., a clock terminal) thereof. Further, the counter 201 is cleared in response to a trailing edge of an output signal of the buffer IC202 received at a terminal CLR (i.e., a reset terminal) thereof in case where the contents thereof (i.e., the count) is matched with or equal to a predetermined positive integer m.

Moreover, in case where the count is equal to a predetermined number n larger than m, it is determined that a failure of the negative polarity signal line 91 is detected. Then, a terminal CRY of the counter 201 is made to be active (correspondingly to logical data "0"). Moreover, the gain of the positive polarity driver amplifying portion 902 is changed from G1 to G2 (to be described later).

Similarly, a counter 202 corresponding to the second counting means is incremented in response to a leading edge of an output signal of the buffer IC202 received at a terminal Ck thereof. Further, the counter 202 is cleared in response to a trailing edge of an output signal of the buffer IC201 received at a terminal CLR thereof. Moreover, in case where the contents of the counter 202 is equal to a predetermined number, it is determined that a failure of the positive polarity signal line 92 is detected. Then, a terminal CRY of the counter 202 is made to be active, and the gain of the negative polarity driver amplifying portion 903 is changed from G1 to G2 (to be described later). Incidentally, the counter 202 may be cleared by performing a voltage level detection instead of rendering the terminal CLR active.

A gate IC203 performs the logical AND between outputs from the terminals CRY of the counters 201 and 202. Then, it is informed by a display device or the like to a user through the failure output terminal 908 that a failure of the negative polarity signal line 91 or of the positive polarity signal line 92 is detected.

Next, the practical configuration of the negative polarity driver amplifying portion 903 will be described hereinafter by referring to FIG. 11. Incidentally, the practical configuration of the negative polarity driver amplifying portion 902 is similar to that of the portion 903 of FIG. 11. Therefore, the description of the practical configuration of the negative polarity driver amplifying portion 902 is omitted herein for brevity of description.

Figure 11:
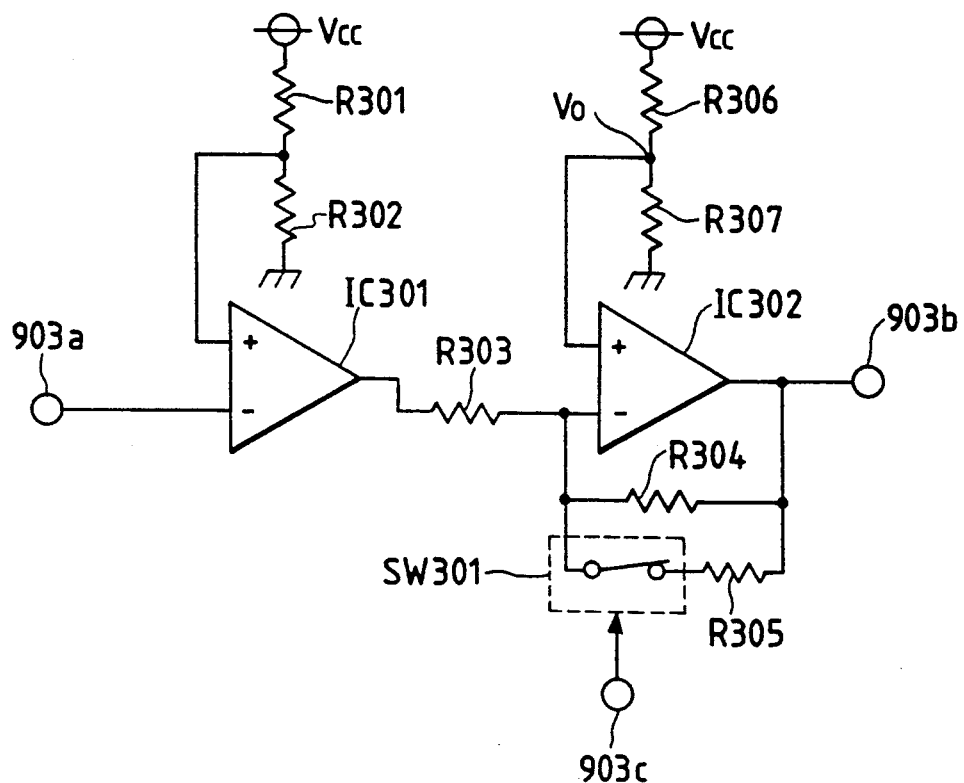
FIG. 11 is a circuit diagram for illustrating the detailed construction of a negative polarity driver amplifying portion of the embodiment of FIG. 9.

As illustrated in FIG. 11, the inverting input terminal of a comparator IC301 is connected to a terminal 903a. Further, a fraction of the source voltage Vcc, which is obtained from the intermediate point between the resistors R301 and R302, is applied to the noninverting input terminal of the comparator IC301. This comparator IC301 is provided in the portion 902 with the intention of regulating logical data to be inverted in a inversion amplifier IC302 of the next stage.

To the noninverting input terminal of the inversion amplifier IC302, a fraction of the source voltage Vcc, which is obtained from the intermediate point between the resistors R306 and 307, is applied. On the other hand, to the inverting input terminal of the amplifier IC302, one of the resistors 304 and 305 is selectively connected by an analog switch SW301 which is turned on or off in response to the control signal input from the failure detection circuit 904 through the terminal 903c. Further, an output of the inversion amplification IC302 is connected to the terminal 903b.

The gain of the inversion amplifier IC302 is changed by turning on or off the analog switch SW301 as above described. For instance, in case where the control signal from the failure detection circuit 904 represents data "1", the analog switch SW301 is turned on. In contrast, in case where the control signal represents data "1", the analog switch SW301 is turned off.

Thus, the gain G1 of the amplifier IC302 at the time when the analog switch SW301 is turned on is given by $$G1 = (R304 \times R305)/\{(R304 + R305) \times R303\} \quad (7)$$

where R303, R304 and R305 denote the resistance of the resistors R303, R304 and R305, respectively.

In contrast, the gain G2 of the amplifier IC302 at the time when the switch SW301 is turned off is obtained by $$G2 = R304/R303 \quad (8)$$

Thereby, the gain of the amplifier IC302 can be increased by turning off the analog switch SW301.

As above described, the gain of the amplifier IC302 is changed in accordance with the control signal output from the failure detection circuit 904. Thus, for example, if no failure is detected in the negative polarity signal line 91 and the positive polarity signal line 92, the switch SW301 is turned on, so that the gain of the amplifier IC302 becomes equal to G1. If a failure is detected in one of the negative polarity signal line 91 and the positive polarity signal line 92, the analog switch SW301 is turned off and the gain of the switch SW301 becomes equal to G2. Incidentally, it will be described later how a failure is detected.

Then, by using the resistors R306 and R307, a voltage to be applied to the noninverting input terminal of the inversion amplifier IC302 (namely, an offset voltage) Vo is set to be an intermediate value in the range of an output voltage of the comparator IC301. Thus, the relation between an input voltage Vin and an output voltage Vout of the negative polarity driver amplifying portion 903 at the time when the analog switch SW301 is turned on is obtained by the following equation.

$$\begin{aligned} Vout &= -G1 \times (Vin - Vo) + Vo \\ &= -(R304 \times R305) \times \\ &\quad (Vin - Vo)/\{(R304 + R305) \times R303\} + Vo \end{aligned} \quad (9)$$

where the input voltage level Vin is a voltage level of a signal input from the terminal 903a thereto and the output voltage level Vout is a voltage level of a signal output from the terminal 903b.

In contrast, the relation between an input voltage Vin and an output voltage Vout of the negative polarity driver amplifying portion 903 at the time when the switch SW301 is turned off is obtained by the following equation.

$$Vout = -G2 \times (Vin - Vo) + Vo \quad (10)$$

-continued
$$= -(R304/R305) \times (Vin - Vo) + Vo$$

Next, an operation of the driver 900 will be described by referring to FIGS. 9 to 11.

In the driver of FIG. 9, first, a digital communication signal representing data "0" or data "1" is applied to the transmission input terminal 906 of the driver 900. Incidentally, the communication signal representing data "0" has zero potential. Further, the communication signal representing data "1" has a predetermined voltage level, which is also 5 V in case of this embodiment. In a state in which no communication signal is applied to the terminal 906, the electric potential of the terminal 906 corresponds to logical data "0".

The digital communication signal input through the transmission input terminal 906 passes through the input buffer IC101 and then is input to the terminal 902a of the positive polarity driver amplifying portion 902. Simultaneously, the digital communication signal is input to the logical inverter IC902 whereupon the data represented by the communication signal is inverted. Subsequently, a signal representing the inverted data is output from the inverter to the terminal 903a of the negative polarity driver amplifying portion 903. Incidentally, the voltage level of a signal output from the buffer IC901 is zero when the output signal is the communication signal representing data "0". In contrast, the voltage level is Vcc when the output signal is the communication signal representing data "1". This is the same with the voltage level of a signal output from the logical inverter IC902.

The digital signal input to the negative polarity driver amplifying portion 903 is amplified therein by employing G1 or G2 as the gain thereof depending on whether the switch SW301 is turned on or off. A signal obtained as the result of the amplification is output the portion 903 to the base of the transistor TR902. Then, a signal, the voltage level of which is equal to a sum of the base-emitter voltage $V_{BE}$ of the transistor TR902 and an output voltage Vout of the negative polarity driver amplifying portion 903, is output from the emitter of the transistor TR902, which is employed in the emitter follower, to the negative polarity signal line 91 through the resistor R902 and the negative polarity signal output terminal 914. Incidentally, this operation is performed in case where the input communication signal represents logical data "1". In case of the input communication signal representing data "0", the transistor TR902 is in an off-state (namely, a nonconducting state) because the voltage level of such a communication signal is zero. Thus, in such a case, no communication signal is output from the transistor TR902.

Similarly, the digital signal input to the positive polarity driver amplifying portion 902 is thereafter output to the base of the transistor TR901. Then, a signal, the voltage level of which is equal to a voltage level obtained by subtracting the base-emitter voltage $V_{BE}$ of the transistor TR901 from the output voltage Vout of the positive polarity driver amplifying portion 902, is output from the emitter of the transistor TR901, which is employed in the emitter follower, to the positive polarity signal line 92 through the resistor R901 and the positive polarity signal output terminal 913. Incidentally, similarly as in case of the negative polarity driver amplification portion 903, this operation is performed in case where the input communication signal represents logical data "1". In case where the input communication signal represents data "0", no communication signal is output from the transistor TR901.

Therefore, the voltage level of the communication signal passing through the positive polarity signal line 92 is set to be the fraction of the voltage Vcc, which is obtained from the intermediate point between the resistors R901 and 903. In contrast, the voltage level of the communication signal passing through the negative polarity signal line 91 is set to be the fraction of the voltage Vcc, which is obtained from the intermediate point between the resistors R902 and R904.

Next, an operation of the receiver 901 will be described hereinbelow by referring to FIGS. 9 and 10.

In the receiver 901 of FIG. 9, a communication signal input to the transmission line 93 of the receiver 901 through the inverting input terminal 914 and the terminal 910, as well as a communication signal input to the transmission line 94 of the receiver 901 through the noninverting input terminal 913 and the terminal 909, is further input to the offset control circuit 905 through the capacitors C901 and C902.

Then, in the offset control circuit 905, the voltage levels of the communication signals input from the transmission lines 93 and 94 are clamped or reestablished at the prescribed voltages Vos− and Vos+, respectively. Subsequently, the clamped communication signals are input to both of the failure detection circuit 904 and the demodulator IC903.

In the failure detection circuit 904, it is determined according to the communication signals input from the transmission lines 93 and 94 thereto whether each of the transmission lines 93 and 94 fails. A signal representing a result of the determination is output from the failure output terminal 908 to the external circuit. Simultaneously with this, the gains of the positive polarity driver amplifying portion 902 and the negative polarity driver amplifying portion 903 of FIG. 11 are changed according to signals representing the result of the determination input from the failure detection circuit through the terminals 911 and 912. A detailed operation of the failure detection circuit 904 will be described later.

In the demodulator IC903, the communication signals respectively input to the noninverting input terminal and the inverting input terminal thereof are compared with each other. Then, the demodulator IC903 outputs a signal representing a result of the comparison to the reception output terminal 907.

Next, a failure detecting operation to be performed in the receiver 901 will be described hereinbelow.

Figure 12:
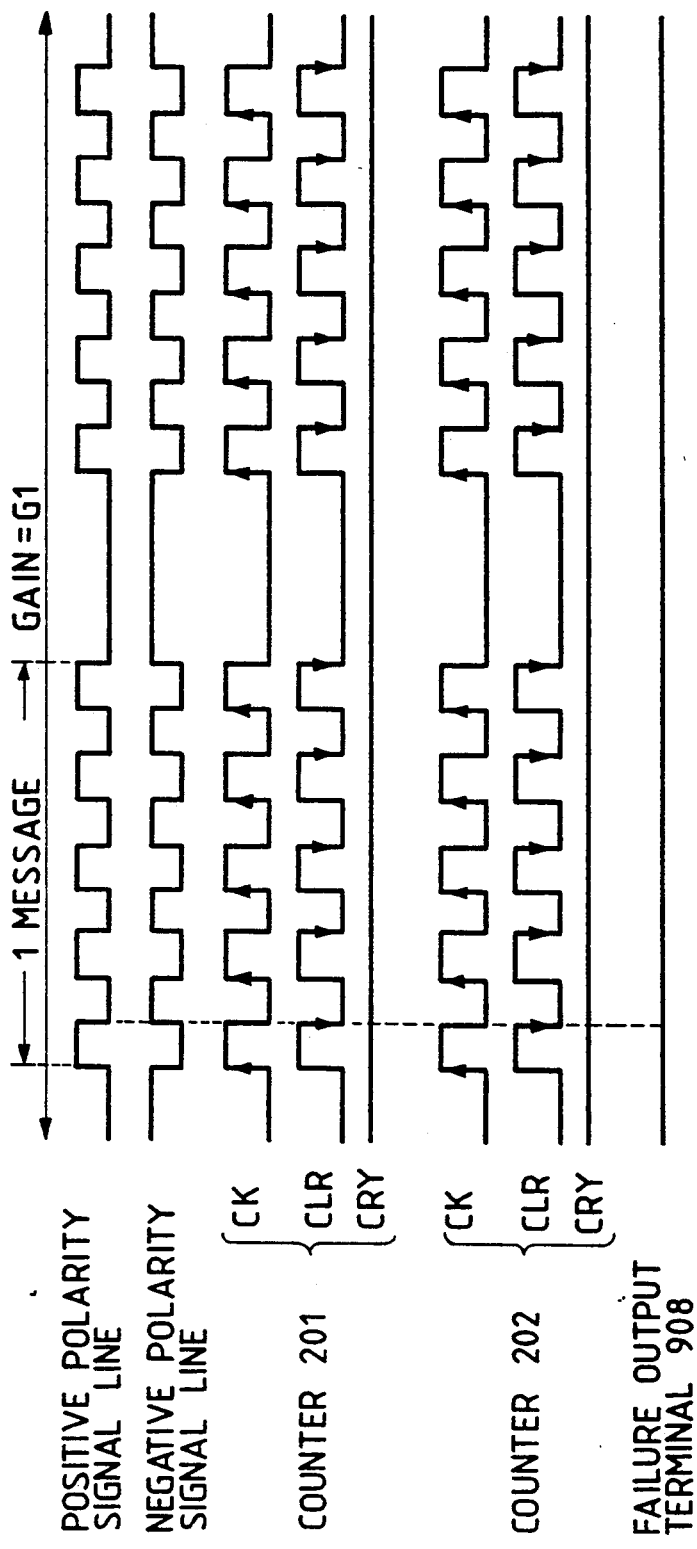
FIG. 12 is a timing chart for illustrating an operation of the failure detection circuit in case where positive and negative polarity signal lines of the embodiment of FIG. 9 are normal.

First, will be described by referring to FIGS. 9, 10 and 12 an operation of the receiver 901 in case where both of the negative polarity signal line 91 and the positive polarity signal line 92 function normally.

In such a case, the sign of the waveform of the communication signal input from the negative polarity signal line 91 is opposite to that of the waveform of the communication signal input from the positive polarity signal line 92. The communication signal is output to both of the failure detection circuit 904 and the demodulator IC903 after passing through the capacitors C901 and C902.

In the failure detection circuit 904, the communication signal input from the transmission line 94 is compared with a threshold voltage $V_{th1}$ established by the buffer IC201, and the communication signal input from the transmission line 93 is compared with a threshold voltage $V_{th2}$ established by the buffer IC202. Signals respectively representing results of these comparisons are output to the counters 201 and 202, respectively.

Here, the buffer IC202 performs a logical inversion of data input thereto with the aim of uniforming logical data respectively output from the buffers IC201 and IC202. For example, in case where logical data represented by a signal input to the driver 900 is changed from "0" to "1", the state of each of the transistors TR901 and TR902 is changed from an off-state to an on-state. Thus the logical data output from each of the buffers IC201 and IC202 is changed from "0" to "1". Conversely, in case where logical data represented by a signal input to the driver 900 is changed from "1" to "0", the logical data output from each of the buffers IC201 and IC202 is changed from "1" to "0".

When logical data represented by a signal input to the driver 900 is "0", the driver 900 is in a state in which a communication is substantially paused or stopped. As is seen from FIG. 12, data represented by a signal input to the driver 900 is turned back to "0" without exception after one message is transmitted. Namely, as is seen from the waveforms of signals output from the buffers IC201 and IC202 to the counters 201 and 202, when logical data represented by each of the signals is changed from "0" to "1" (incidentally, this change in logical data corresponds to change in voltage level of a leading edge of the waveform from zero potential to Vcc), the logical data represented by each of the signals is thereafter changed from "1" to "0" without exception (incidentally, this change in logical data corresponds to change in voltage level of a trailing edge of the waveform from Vcc to zero potential).

Therefore, in case of detecting, for instance, a failure of the positive polarity signal line 92, an output signal of the buffer IC202 obtained by inverting the communication signal having passed through the negative polarity signal line 91 is applied to the terminal Ck of the counter 202, which is a trigger terminal used to increment the counter 202. Further, an output signal of the buffer IC201 obtained by buffering the communication signal having passed through the positive polarity signal line 92 is applied to the terminal CLR of the counter 202, which is a trigger terminal used to clear the counter 202.

Thus, when both of the negative polarity signal line 91 and the positive polarity signal line 92 normally function, a fall of the output signal of the buffer IC201 invariably occurs correspondingly to a rise of the output signal of the buffer IC 202. The counter 202 is cleared every m times (incidentally, m is the predetermined positive integer as above described) of inputting the signal from the buffer IC202 thereto. Hence, the contents of the counter 202 is incremented up to m less than the predetermined number n. Moreover, the counter 202 keeps outputting a signal representing logical data "1" from the terminal CRY thereof. Moreover, no control signal is output to the negative polarity driver amplifying portion 903 through the terminal 912. Consequently, the analog switch SW301 is in an off-state, and the gain of the negative polarity driver amplifying portion 903 remains equal to G1.

Incidentally, an operation of detecting a failure of the negative polarity signal line 91 by using the counter 201 is the same as the above described operation of detecting a failure of the negative polarity signal line 91 by using the counter 202. Therefore, the description of the operation of detecting a failure of the negative polarity signal line 91 by using the counter 201 is omitted for brevity of description.

Next, will be described by referring to FIGS. 9, 11 and 13 a failure detecting operation of the receiver 901 in case where one of the negative polarity signal line 91 and the positive polarity signal line 92 fails. Incidentally, will be described herein by way of example a failure detecting operation in case where the negative polarity signal line 91 shorts, namely, is fixed at zero potential.

Figure 13:
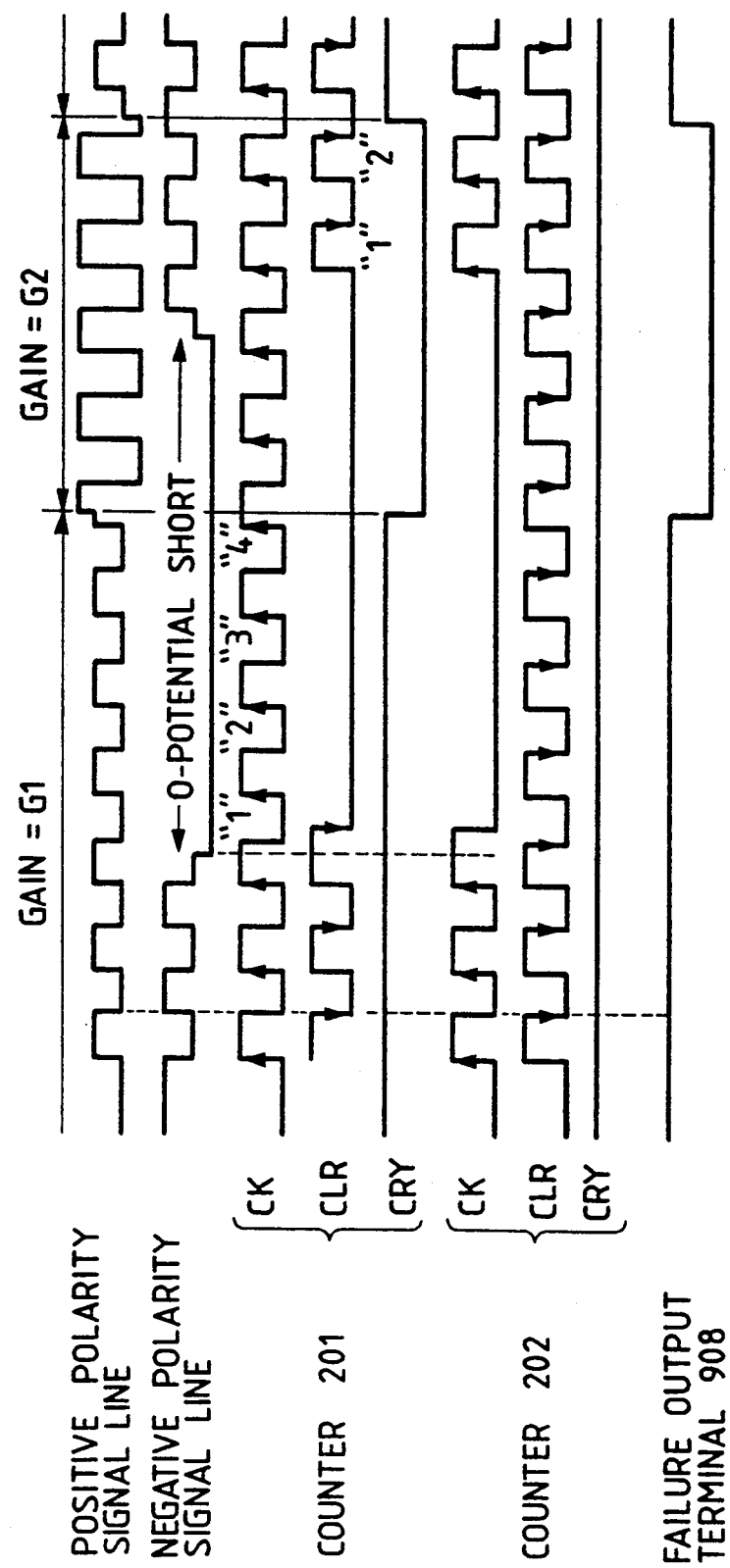
FIG. 13 is a timing chart for illustrating an operation of the failure detection circuit in case where the negative polarity signal line of the embodiment of FIG. 9 fails.

As is illustrated in FIG. 13, when the negative polarity signal line 91 is fixed at zero potential (namely, fails), data represented by the voltage level of a signal output from the buffer IC202, which compares the voltage level of the communication signal having passed through the negative polarity signal line 91 with the threshold voltage $V_{th2}$, changes from "1" to "0" a little while later as indicated by the waveform of the signal input to the terminal CLR of the counter 201 or of the signal input to the terminal Ck of the counter 202. Thereafter, the logical data "0" is kept output by the buffer IC202 until the negative polarity signal line 91 is restored to normal.

The reason why the data represented by the signal input to the terminal CLR of the counter 201 or to the terminal Ck of the counter 202 does not change from "1" to "0" immediately after the negative polarity signal line 91 fails is that although the voltage level of the communication signal having passed through the negative polarity signal line 91 falls to zero at the moment when the line 91 fails, the voltage level of such a communication signal takes a period of time, which is established by the time constants of the resistor R201 and the capacitor C901, to exceed the threshold voltage level $V_{th2}$.

During such a period of time, the communication signal having passed through the positive polarity signal line 92 is input through the buffer IC201 to both of the terminal Ck of the counter 201 and the terminal CLR of the counter 202 as an output signal of the buffer IC201. At that time, the output signal of the buffer IC202 is applied to the terminal CLR of the counter 201. The logical data represented by the signal input to the terminal CLR of the counter is fixed at logical "0" due to the failure of the negative polarity signal line 91. Namely, there are no rise and fall of the signal input to the terminal CLR of the counter 201. Therefore, the counter 201 is not cleared. Thus the counter 201 is kept incremented in response to leading edges of the signal input to the terminal Ck thereof. When the count indicated by the counter 201 reaches the predetermined number n (incidentally, n=4 in case of this embodiment as is seen from FIG. 13), the logical data represented by the signal input to the terminal CRY of the counter 201 is changed from "1" to "0". Incidentally, the counter 202 is not incremented because the logical data represented by the signal input to the terminal Ck thereof is fixed at logical "0". Thus, the data "1" represented by the terminal CRY of the counter 201 is maintained.

Then, the gate IC203 performs the logical AND between outputs from the terminals CRY of the counters 201 and 202. A signal representing the logical AND operation is output therefrom to an external circuit through the failure output terminal 908 to inform a user of the failure of one of the communication signal lines.

On the other hand, the signal from the terminal CRY of the counter 201 is output to the analog switch SW301 of the negative polarity driver amplifying portion 903 of the driver 900 through the terminal 912 as a control signal. Thus the gain of the negative polarity driver amplifying portion 903 is changed from G1 to G2. Incidentally, it will be described later the reason why the gain of the driver amplifying portion is changed from G1 to G2 when a failure of the signal lines is detected.

Thereafter, when the negative polarity signal line 91 is returned to normal, a communication signal passes through the negative polarity signal line 91 again and moreover a signal output from the buffer IC202 to the terminal CLR of the counter 201 become present again as illustrated in FIG. 13. When the number of falls of the signal output from the buffer IC201 thereto reaches the predetermined number m (incidentally, m=2 in case of this embodiment as illustrated in FIG. 13), the counter 201 is cleared. Consequently, the data represented by the signal output from the terminal CRY of the counter 201 is changed from logical "0" to "1".

As the result, the output of the gate IC203 is changed from logical "0" to "1" to inform a user of the fact that the failure of the communication line is removed. Simultaneously, the gain of the negative polarity driver amplifying portion 903 of the driver 900 is changed from G2 to G1.

Additionally, when the positive polarity signal line 92 fails, the counter 201 operates similarly as the counter 202 does in case where the negative polarity signal line 91 fails. Thus, a user is informed of the fact that one of the communication lines fails. Further, the gain of the positive polarity driver amplifying portion 902 is changed.

As above described, in case of the failure detection circuit of the second embodiment, the communication signals passing through the negative polarity signal line 91 and the positive polarity signal line 92 (namely, digital signals obtained by performing the demodulation by using the predetermined threshold voltage levels) are input to the terminals Ck and CLR of the two counters, by which failures of the negative polarity signal line 91 and the positive polarity signal line 92 are detected in parallel with each other. Thereby, a period of time required for detecting a failure of the signal lines can be substantially reduced.

Additionally, in case where the communication apparatus is of the type to be loaded or provided in an automobile, there may often be a considerable difference among zero potential levels of electronic control units (ECUs) due to large current flowing through lamps or the like. Even in such a case, the apparatus of the present invention can detect a failure of the signal lines with high reliability by using the communication signals clamped by the offset control circuit 905 independent of the difference or change in zero potential level in comparison with the conventional apparatus in which a detection of a failure is effected according to the voltage level of the communication signal passing through the signal line.

In case of the above described operation of the second embodiment, the predetermined number n of the leading edges of the signal input to the terminal Ck of the counter is 2 and the predetermined number m of the trailing edges of the signal input to the terminal Ck of the counter is 4. However, these values of the numbers m and n may be freely changed according to the internal circuit configuration of the counter.

Next, it will be described hereinbelow by referring to FIG. 14 why the gain of the driver amplifying portions of the driver 900 is changed from G1 to G2.

Figure 14:
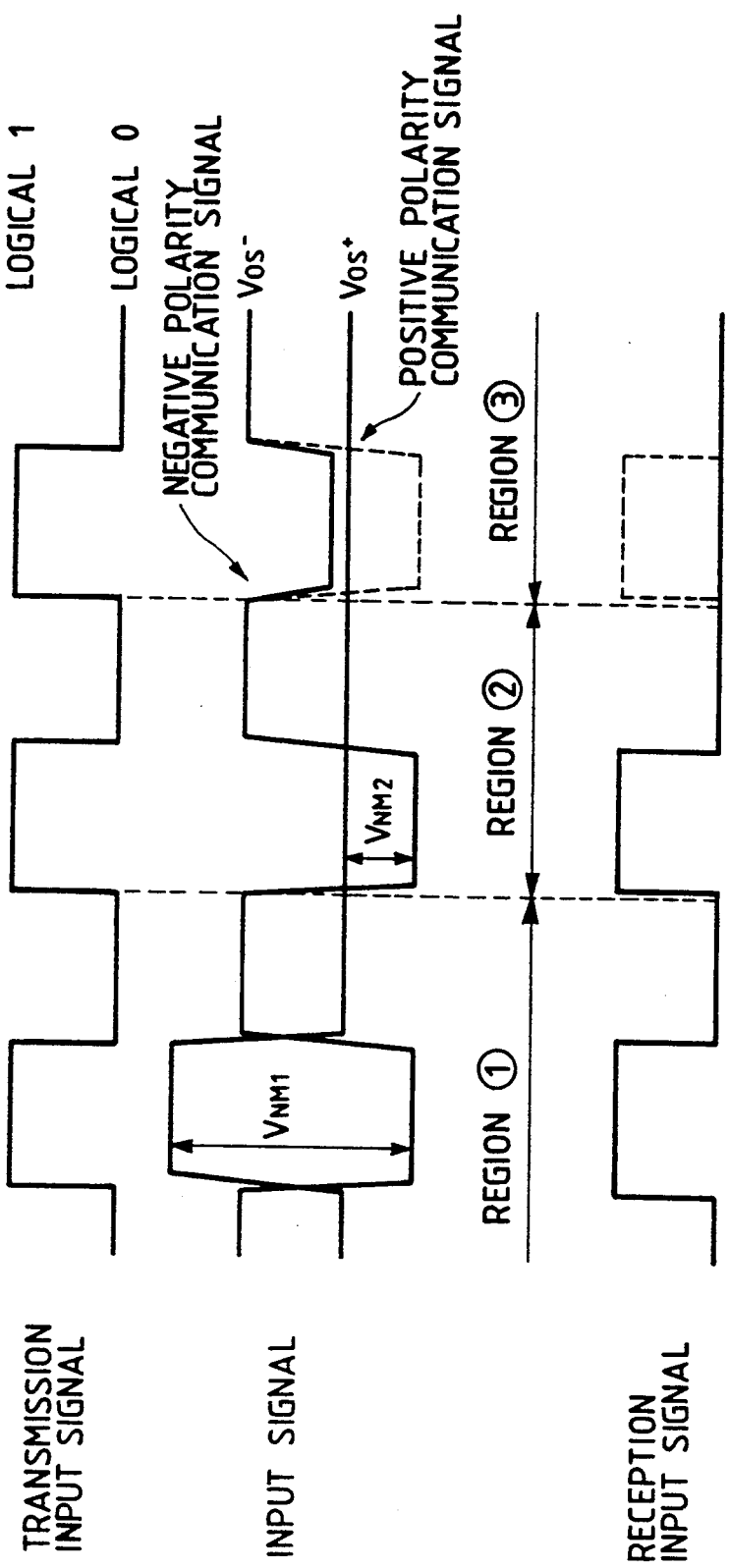
FIG. 14 is a waveform chart for illustrating change of gain of a receiver, which is effected when a failure is detected in the embodiment of FIG. 9.

FIG. 14 is a waveform chart for illustrating the waveform of a signal input to the transmission input terminal 906 of the driver 900, the waveforms of signals input to the noninverting and inverting input terminals of the demodulator IC903 of the receiver 901 and the waveform of a signal output from the reception output terminal 907 of the receiver 901. Incidentally, in case of this example of FIG. 14, the gain of the driver 900 is not changed after the signal line fails as in case of the embodiment above described.

In FIG. 14, the region ①is the waveform in case where both of the negative polarity signal line 91 and the positive polarity signal line 92 function normally. In this region, the voltage level of the communication signal (hereunder referred to as the positive polarity communication signal) passing through the positive polarity signal line 92 varies from the voltage level $V_{os}+$, and on the other hand the voltage level of the communication signal (hereunder referred to as the negative polarity communication signal) passing through the negative polarity signal line 91 varies from the voltage level $V_{os}-$. Further, what is called a noise margin is set to be $V_{NM1}$ in case where logical data represented by the signal input to the transmission input terminal 906 of the driver 900 is logical "1".

The region ② is the waveform in case where the positive polarity signal line 92 fails. In this region, the voltage level of the signal input to the noninverting input terminal of the demodulator IC903 is fixed at the voltage level $V_{os}+$ and only the voltage level of the signal input to the inverting input terminal thereof varies similarly as in the region ①. In case of the region ②, the waveform of the negative polarity communication signal intersects that of the positive polarity communication signal at the voltage level $V_{os}+$. Thus a demodulation signal is generated at the reception output terminal 907 of the receiver 901. Incidentally, the noise margin is $V_{NM2}$, which is apparently less than $V_{NM1}$, in case where the logical data represented by a signal input to the transmission input terminal 906 is logical "1".

However, as above described, in case where the communication apparatus is of the type to be loaded or provided in an automobile, there may often occurs a considerable difference among zero potential levels of ECUs due to large current flowing through lamps or the like. Thus, in case where a considerable difference among zero potential levels of ECUs occurs when the positive polarity signal line 92 fails, the amplitude of each communication signal becomes smaller in comparison with the amplitude thereof in case where there is substantially no difference among zero potential levels of ECUs. Therefore, the apparatus has a drawback in that as is seen in region ③, the amplitude of the negative polarity communication signal is not sufficiently large to the extent that the waveform of the negative polarity communication signal intersects that of the positive polarity communication signal at the voltage level $V_{os}+$ and in that a demodulation cannot be effected by using the demodulator IC903.

To eliminate this drawback, in case of the second embodiment, when a failure of one of the signal lines is detected by the failure detection circuit 904, an amplification degree is increased by changing the gains of the driver amplifying portions of the driver 900 from G1 to G2 such that even if a considerable difference among zero potential levels of ECUs to be provided with the communication apparatus occurs, the waveform of the communication signal other than the communication signal corresponding to the signal line which fails can intersect the waveform of the communication signal corresponding to the signal line, which fails, at a certain voltage level thereof.

As described above, an increasing of the amplitude of a transmission signal by changing the gains of the driver amplifying portions to reliably demodulate reception data signal can be employed as a countermeasure to a failure of the transmission lines other than an issuing of a signal to a user, which informs of the fact that there is a transmission line which fails.

As is apparent from the foregoing description, the communication driver/receiver of the second embodiment can more correctly detect a failure of the transmission lines by using a simpler circuit configuration and by alternately monitoring leading or trailing edges of the negative and positive polarity communication signals, in comparison with the conventional apparatus in which a failure is detected by determining whether or not the voltage level of each of the negative and positive polarity communication signals is within a predetermined range of voltage levels.

Moreover, even if the amplitude of the communication signal is limited to a small value due to a considerable difference among zero potential levels of ECUs, each of which is provided with the communication driver/receiver, the communication apparatus of the present invention can securely perform a normal demodulation by increasing the amplitude of the communication signal by changing the gain of the driver corresponding to the transmission line which functions normally.

Figure 1:
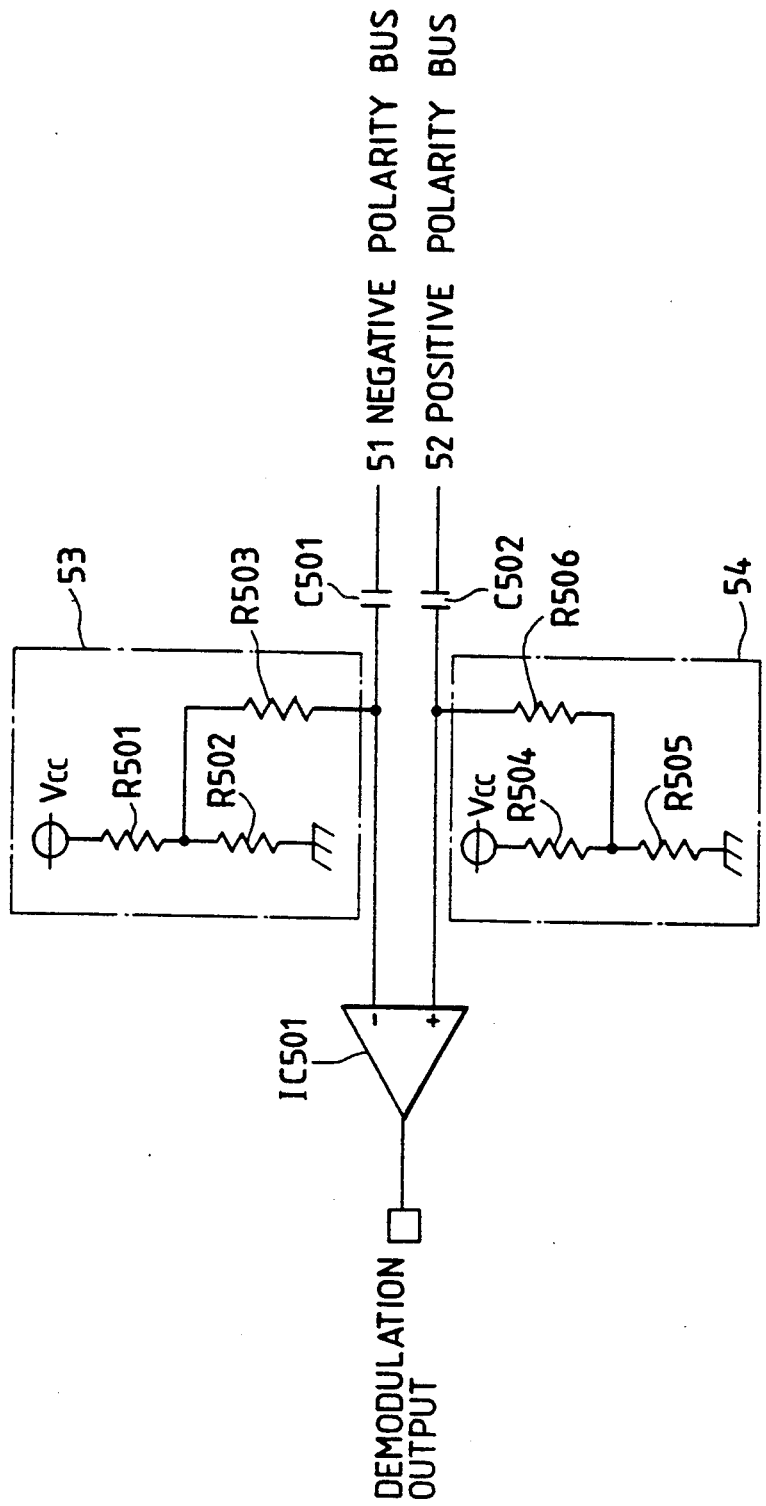
FIG. 1 is a circuit diagram for illustrating the configuration of a conventional balanced type communication apparatus.
Figure 2:
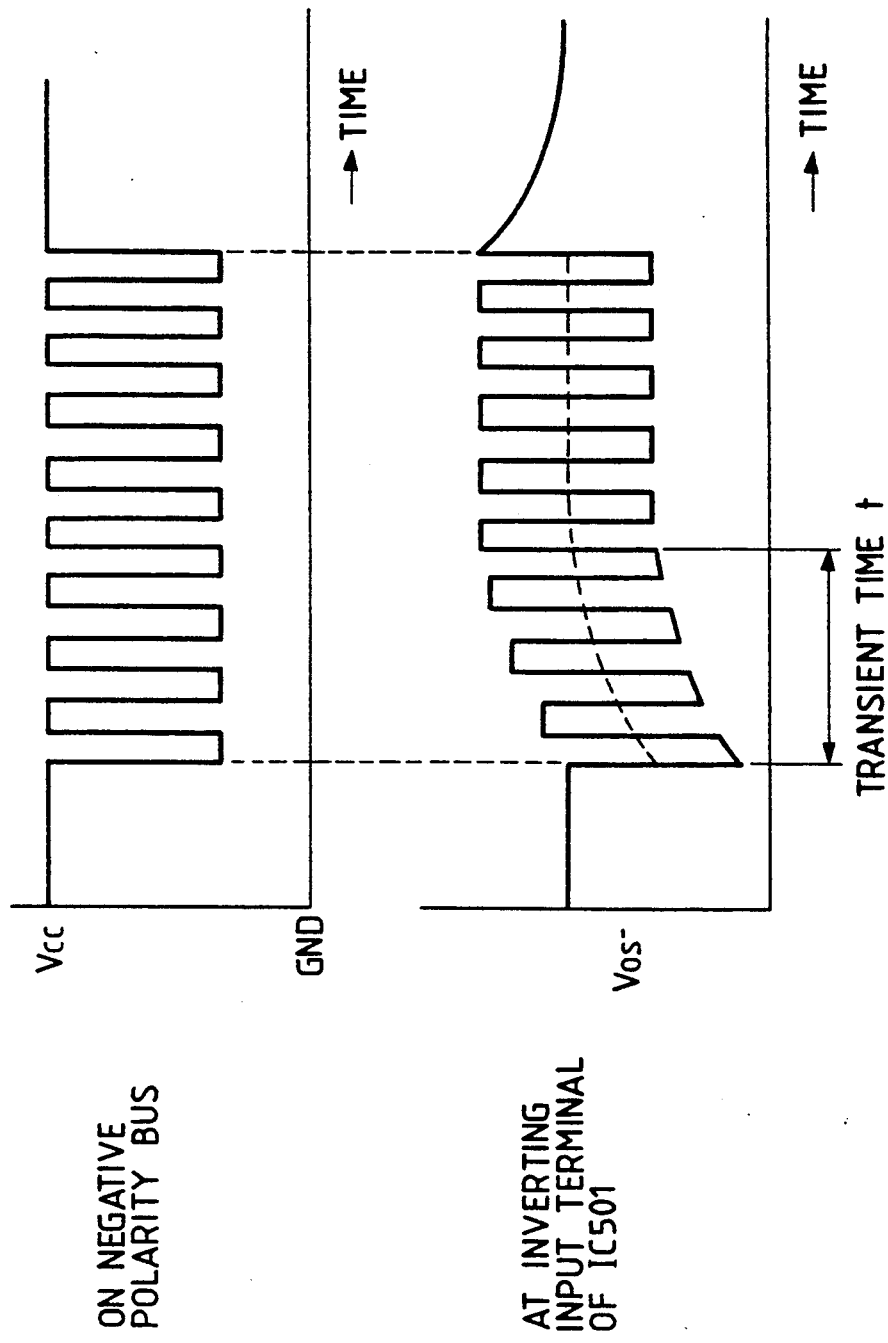
FIG. 2 is a waveform chart for showing the waveform of a signal at the inverting input terminal of a comparator of the conventional apparatus of FIG. 1 and that of a signal passing through a negative polarity bus thereof.
Figure 3:
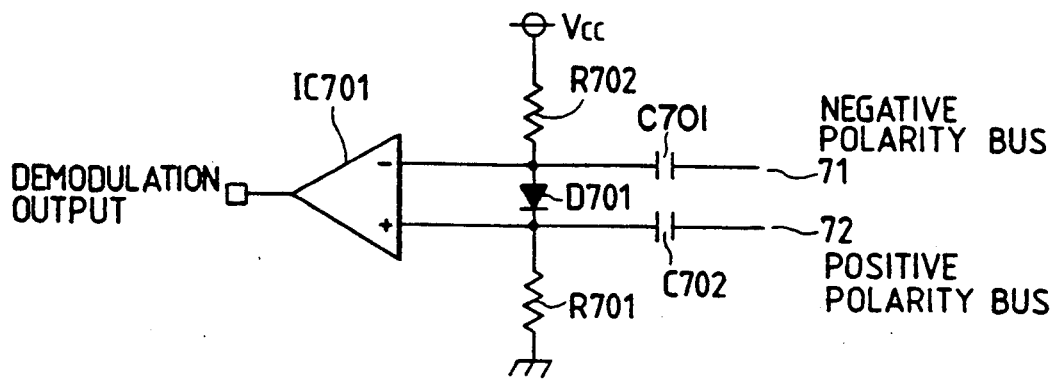
FIG. 3 is a circuit diagram for illustrating the configuration of another conventional balanced type communication apparatus.
Figure 4:
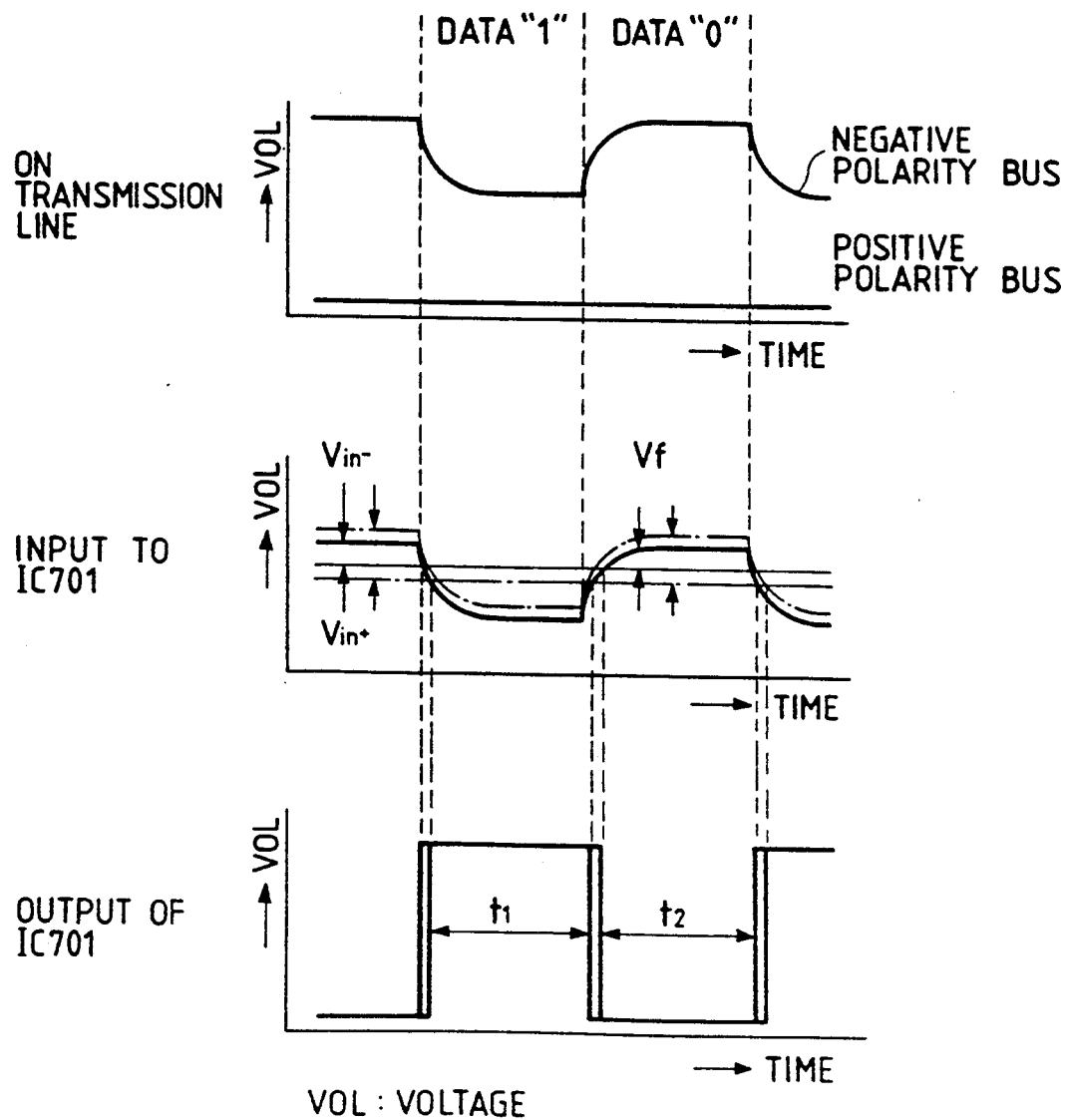
FIG. 4 is a waveform chart for showing the waveforms of input and output signals of a comparator of the conventional apparatus of FIG. 3 and that of a signal passing through a transmission line thereof.
Figure 5:
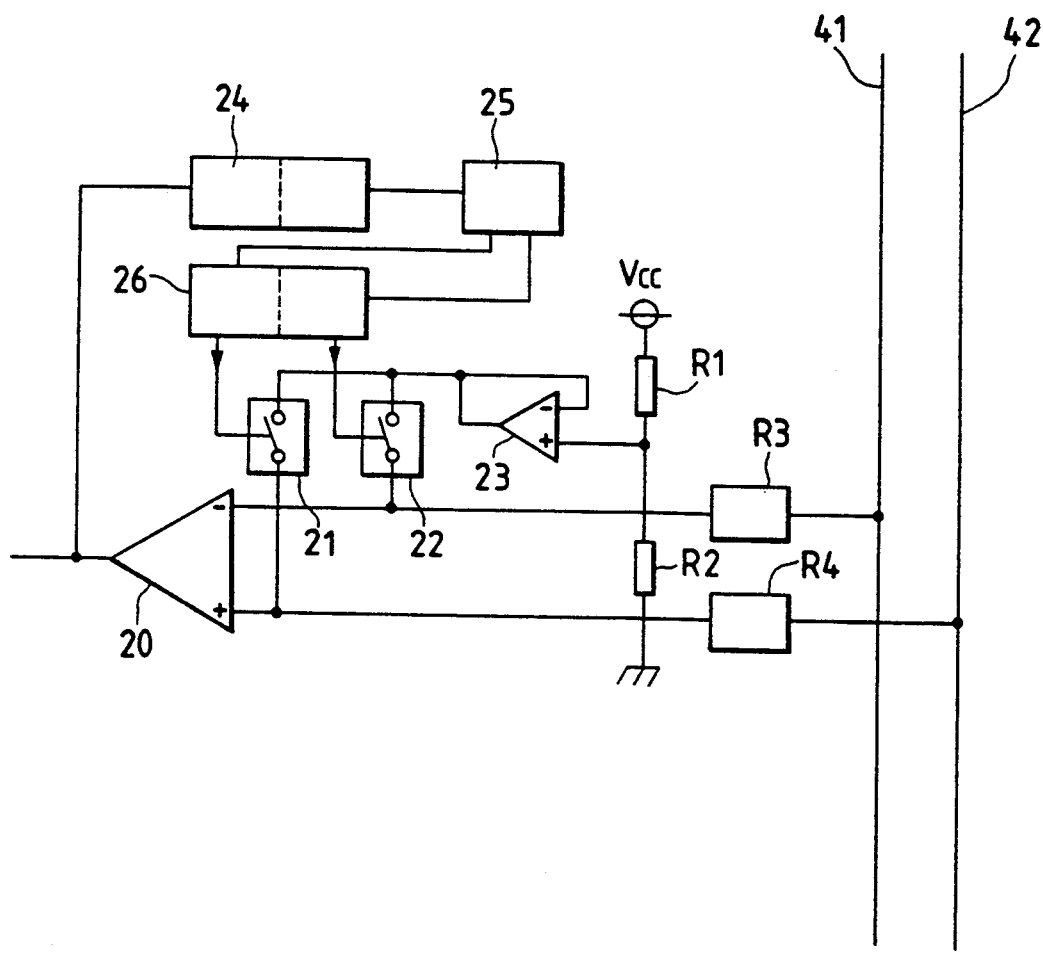
FIG. 5 is a schematic block diagram for illustrating the construction of a conventional failure detection circuit.

In addition, the communication apparatus of the present invention can be versatile as the result of detecting a failure of the transmission lines by using each of the negative and positive polarity communication signals in comparison with the conventional apparatus of FIG. 5 in which the counter 24 counting at a regular rate is reset in response to a demodulation signal from the comparator 20 and thus the predetermined value of the count to be used as a reference for determining whether each of the transmission lines fails should be changed in case where systems provided with the communication apparatuses are different in network architecture and access period employed from one another.

Next, still another embodiment (hereunder sometimes referred to as a third embodiment) of the present invention will be described hereinbelow.

The third embodiment employs a system or method of changing the voltage level of a reception signal corresponding to a transmission line, of which a failure is detected, by varying the predetermined voltages Vos+ and Vos− to which the voltage levels of communication signals are clamped by each of the voltage clamping circuits 203 and 204 as a countermeasure to the failure of the transmission signals, instead of the above described countermeasures employed in the second embodiment (namely, an increasing of the amplitude of a transmission signal by changing the gains of the driver amplifying portions to reliably demodulate reception data signal and an issuing of a signal to a user, which informs of the fact that there is a transmission line which fails).

Figure 15:
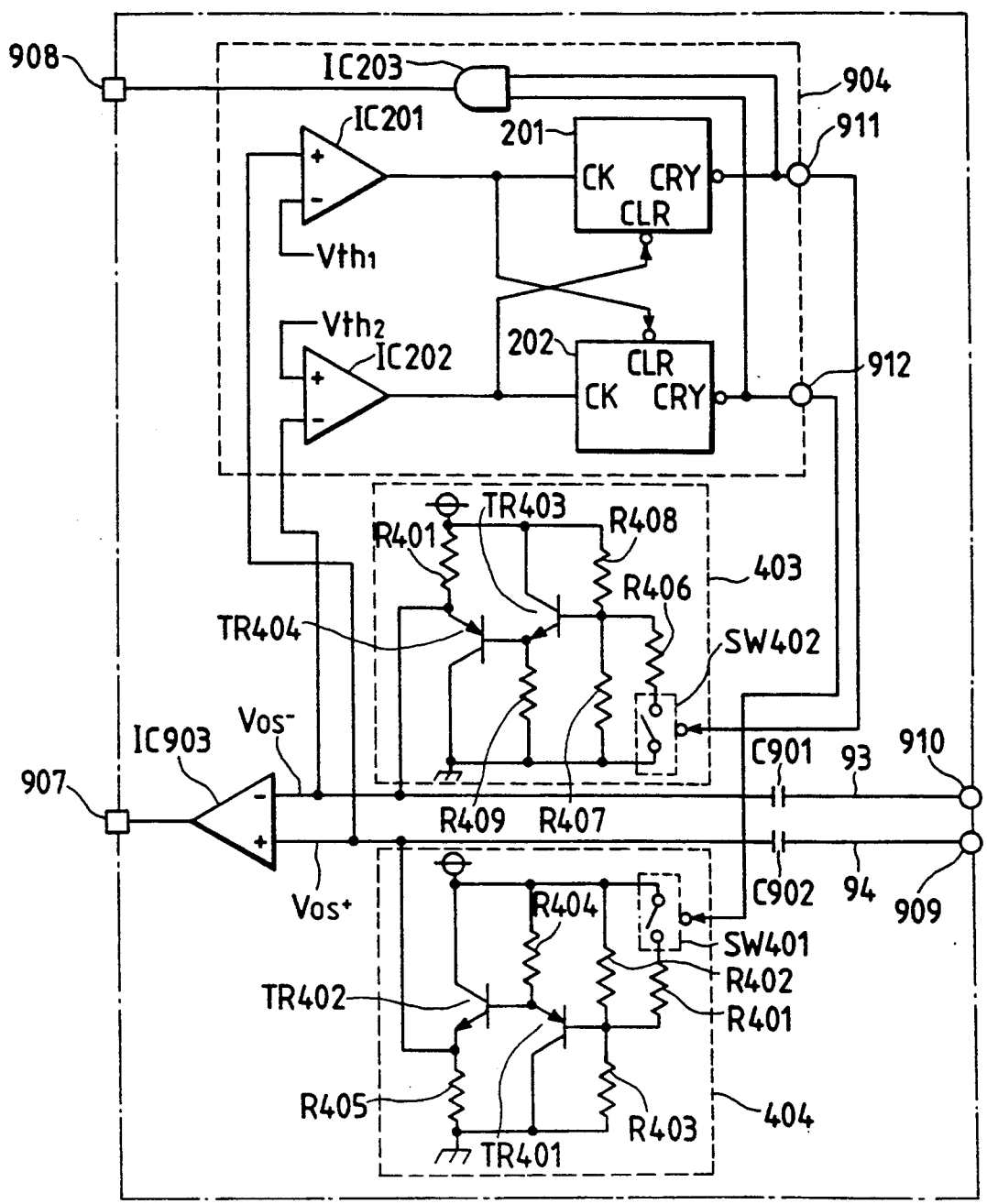
FIG. 15 is a diagram for showing the detailed construction of a failure detection circuit and an offset control circuit of another embodiment of the present embodiment.

Namely, as illustrated in FIG. 15, switches SW401 and SW402 for changing the voltage levels of reception signals input to the transmission lines according to results of the determination made by the counters 201 and 202 are provided in voltage clamping circuits 403 and 404, respectively. When a failure of the transmission lines is detected by the counters 201 and 202, signals indicating the detection of the failure are output from the terminals 911 and 912 to the switches SW401 and SW402 to disable these switches. Thereby, the voltage level of the reception signal corresponding to the transmission line, which fails, can be changed (or reduced).

Differently from the voltage clamping circuits 203 and 204 of the second embodiment, the voltage clamping circuits 403 and 404 are provided with temperature compensation circuits, respectively. One of the temperature compensation circuits has a PNP transistor TR402 and an NPN transistor TR401, which are complementary to each other. The other of the temperature compensation circuits has a PNP transistor TR403 and an NPN transistor TR404, which are complementary to each other. Thereby, even when temperature of a working environment varies, the voltage level of the communication signals can surely be effected. Consequently, an accurate demodulation can be achieved.

Next, an operation of the third embodiment will be described hereinbelow. FIG. 16 is a timing chart for illustrating an operation of the failure detection circuit and a state of each signal input to the demodulator IC903 in case where the negative polarity signal line fails.

As is seen from FIGS. 15 and 16, the positive polarity communication signal and the negative polarity communication signal vary from voltage levels Va and Vb, respectively, in case where the transmission line 93 (thus, the negative polarity signal line 91) and the transmission line 94 (thus, the positive polarity signal line 92) function normally.

Further, if the voltage level of the transmission line 93 (thus, the negative polarity signal line 91) is fixed at a zero potential level (namely, if the line 93 fails) in a region ④ of FIG. 16 due to some cause, the voltage level of the signal input to the inverting input terminal of the demodulator IC903 is fixed at the voltage level Va by the voltage clamping circuit 403. Incidentally, in the region ④ and a region ⑥ (to be described later), the voltage level of the signal input to the inverting input terminal of the demodulator IC903 does not immediately become equal to Va under the influence of the capacitor 901 and a resistor R406 during a predetermined period of time since the transmission line 93 fails or is restored to normal.

Then, the counter 201, which is incremented in response to a leading edge of an output signal of the buffer IC201 received at the terminal Ck thereof and is cleared in response to a trailing edge of an output signal of the buffer IC202 received at the terminal CLR thereof, is reset immediately after the voltage level of the communication signal passing through the transmission line 93 becomes equal to Va. In contrast, the counter 202 is not reset but is kept incremented when the voltage level of the communication signal passing through the transmission line 93 is fixed at the voltage level Va.

Thereafter, when the count reaches the predetermined number (incidentally, the predetermined number is 4 in case of the third embodiment as is seen from FIG. 16), it is determined that a failure is detected by the counter 201. Further, a signal indicating the detection of the failure of one of the transmission lines is output through the failure output terminal 908 to the external circuit. Then, the terminal CRY of the counter 201 is made to be active (correspondingly to a signal indicating the detection of the failure). Moreover, the switch SW402 is disabled (in a region ⑤ of FIG. 16). Thereby, the voltage level of the communication signal passing through the transmission line 93, which has been fixed at the voltage level Va as above described, is changed to another voltage level, which is a little lower than the voltage level Va (preferably, to an intermediate voltage level between the highest and lowest voltage levels of the communication signal passing through the transmission line 94 which functions normally). Consequently, the waveform of the communication signal passing through the transmission line 93 comes to intersect the waveform of the signal input to the noninverting input terminal of the demodulator IC903.

In case where the transmission line 93 (thus, the negative polarity signal line 91) is thereafter restored to normal (in the region ⑥) due to some cause, the counter 201 is reset when the number of times of the falls of the signal input to the terminal CLR thereof reaches a predetermined number (i.e., 2 as is seen from FIG. 16). Moreover, a signal indicating the restoration of the communication signal line to normal is output through the failure output terminal 908 to the external circuit. Simultaneously, the terminal CRY thereof is made to be passive (correspondingly to a signal indicating the elimination of the failure), and the switch SW402 is enabled (in a region ⑦ of FIG. 16).

As described above, the third embodiment can achieve an accurate demodulation by changing the predetermined voltages, to which the voltage levels of the communication signals are clamped by the voltage clamping circuit, even when one of the transmission lines fails.

Namely, the receiver 901 has fault tolerance by being provided with the voltage clamping circuits. However, in case of some voltage level (hereunder referred to as some failing voltage level), at which the transmission line fails, it may happen that as illustrated in FIG. 16, the waveform of the communication signal corresponding to the transmission line, which fails, does not intersect the waveform of the communication signal corresponding to the transmission line which functions normally. Further, in case of another failing voltage level, it may happen that the waveform of the communication signal corresponding to the transmission line, which fails, intersects the waveform of the communication signal corresponding to the transmission line, which functions normally, at a voltage level which is excessively different from the intermediate voltage levels between the highest and lowest voltage levels of the communication signal passing through the normal transmission line.

In the latter case, a demodulation is effected but an inaccurate portion may be generated due to slight difference in amplitude between an actual demodulation signal and a normally demodulated signal. However, a more accurate demodulation can be achieved by changing the prescribed voltages to which the voltage levels of the communication signals are clamped by the voltage clamping circuits, according to a result of the detection of a failure as in case of the third embodiment such that the waveform of the communication signal corresponding to the transmission line, which fails, intersects the waveform of the communication signal corresponding to the normal transmission line at an intermediate voltage between the highest and lowest voltage levels of the communication signal corresponding to the normal transmission line.

While preferred embodiments of the present invention have been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A fault tolerant communication apparatus having balanced type transmission lines composed of first and second transmission lines respectively transmitting first and second complementary communication signals of different polarity, a transmission device for transmitting the first and second complementary communication signals through the balanced type transmission lines, a reception device for receiving the first and second complementary communication signals through the balanced type transmission lines and for receiving contents of a communication based on the complementary relation between said first and second communication signals and a failure detection circuit for determining whether or not each of the first and second transmission lines fails, wherein the failure detection circuit comprises:

first judgement means for monitoring the second transmission line according to the first communication signal, for resetting a second-transmission-line monitoring state, in which the second transmission line is monitored, in response to the second communication signal and for judging whether or not the second transmission line fails, on the basis of a fact that the second-transmission-line monitoring state continues for a predetermined period of time; and second judgement means for monitoring the first transmission line according to the second communication signal, for resetting a first-transmission-line monitoring state, in which the first transmission line is monitored, in response to the first communication signal and for judging whether or not the first transmission line fails, on the basis of a fact that the first-transmission-line monitoring state continues for a predetermined period of time.

2. The communication apparatus as set forth in claim 1, wherein the first judgement means comprises first counting means for counting the number of times of generation of the first communication signal, for resetting the counted number of times of generation of the first communication signal to zero in response to the second communication signal and for outputting a signal indicating a failure of the second transmission line in case where the counted number of times of generation of the first communication signal reaches a predetermined value, wherein the second judgement means comprises second counting means for counting the number of times of generation of the second communication signal, for resetting the counted number of times of generation of the second communication signal to zero in response to the first communication signal and for outputting a signal indicating a failure of the first transmission line in case where the counted number of times of generation of the second communication signal reaches a predetermined value.

3. The communication apparatus as set forth in claim 1 or 2, wherein data represented by each of the first and second communication signals is a combination of data of 1 and 0, wherein each of the balanced type transmission lines is connected to demodulation means for receiving the first and second communication signals and for outputting a demodulation output signal, wherein first and second capacitors are inserted in the first and second transmission lines, respectively, wherein a first voltage clamping circuit for clamping a voltage level of the first communication signal, which has passed through the first capacitor and should be input to the demodulation means, to a predetermined voltage level represented by a part of the first communication signal corresponding to data of 0, wherein a second voltage clamping circuit for clamping a voltage level of the second communication signal, which has passed through the second capacitor and should be input to the demodulation means, to a predetermined voltage level represented by a part of the second communication signal corresponding to data of 0, wherein each of the first and second voltage clamping circuits changes the predetermined voltage according to a result of determination made by the failure detection circuit.

4. The communication apparatus as set forth in claim 3, wherein the first voltage clamping circuit has a first temperature compensation circuit and clamps the voltage level of the first communication signal input to the demodulation means by using the first temperature compensation circuit, wherein the second voltage clamping circuit has a second temperature compensation circuit and clamps the voltage level of the second communication signal input to the demodulation means by using the second temperature compensation circuit.

5. The communication apparatus as set forth in claim 4, wherein the first voltage clamping circuit has a first temperature compensation circuit and clamps the voltage level of the first communication signal input to the demodulation means by using the first temperature compensation circuit, wherein the second voltage clamping circuit has a second temperature compensation circuit and clamps the voltage level of the second communication signal input to the demodulation means by using the second temperature compensation circuit.

* * * * *